United States Patent
Liu et al.

(10) Patent No.: US 10,772,068 B1
(45) Date of Patent: Sep. 8, 2020

(54) ESTIMATION OF MOBILE DEVICE COUNT

(71) Applicant: HERE Global B.V., Eindhoven (NL)

(72) Inventors: Xiang Liu, Berlin (DE); Friedrich Hartmann, Berlin (DE); Christian Stade-Schuldt, Berlin (DE); Philo Pöllmann, Berlin (DE); Mohamed Ahmed, Berlin (DE)

(73) Assignee: HERE Global B.V., Eindhoven (NL)

( * ) Notice: Subject to any disclaimer, the term of this patent is extended or adjusted under 35 U.S.C. 154(b) by 0 days.

(21) Appl. No.: 16/417,055

(22) Filed: May 20, 2019

(51) Int. Cl.
| | | |
|---|---|---|
| H04W 64/00 | (2009.01) | |
| G01S 19/51 | (2010.01) | |
| H04W 4/029 | (2018.01) | |

(52) U.S. Cl.
CPC ........... H04W 64/003 (2013.01); G01S 19/51 (2013.01); H04W 4/029 (2018.02)

(58) Field of Classification Search
None
See application file for complete search history.

(56) References Cited

U.S. PATENT DOCUMENTS

| | | | | |
|---|---|---|---|---|
| 8,504,034 | B2 * | 8/2013 | Miyake | G06Q 10/06 455/435.1 |
| 2009/0022080 | A1 * | 1/2009 | Edlund | H04W 4/08 370/315 |
| 2011/0085488 | A1 * | 4/2011 | Widegren | H04W 72/005 370/312 |
| 2011/0173235 | A1 * | 7/2011 | Aman | G06K 9/00342 707/792 |
| 2013/0090891 | A1 | 4/2013 | Kobayashi | |
| 2013/0165168 | A1 * | 6/2013 | Jintaseranee | H04W 24/08 455/507 |
| 2017/0195394 | A1 * | 7/2017 | Kothari | H04L 65/1069 |

FOREIGN PATENT DOCUMENTS

JP 2003122877 A 4/2003

OTHER PUBLICATIONS

Jie Feng et al., "A Bimodal Model to Estimate Dynamic Metropolitan Population by Mobile Phone Data", Sensors, Oct. 2018, 15 pages, vol. 18.
Pierre Deville et al., "Dynamic Population Mapping Using Mobile Phone Data", PNAS, Nov. 11, 2014, pp. 15888-15893, vol. 111, No. 45.
Zhang Liu et al., "Mapping Hourly Dynamics of Urban Population Using Trajectories Reconstructed from Mobile Phone Records", Transactions in GIS, Feb. 2018, 21 pages.

* cited by examiner

*Primary Examiner* — Charles N Appiah
*Assistant Examiner* — Frank E Donado
(74) *Attorney, Agent, or Firm* — Lempia Summerfield Katz LLC

(57) ABSTRACT

A method, system, and apparatus for estimation of a number of mobile devices include receiving one or more probe data points including a location, a session identifier, and a timestamp, constructing a trajectory including the one or more probe data points having a same session identifier, calculating a trajectory duration for the trajectory based on the timestamps of the one or more probe data points, calculating a normalized trajectory from the trajectory duration and a predetermined observation duration, and estimating the number of mobile devices from at least the normalized trajectory. A path of the trajectory is based on the location of the one or more probe data points.

20 Claims, 15 Drawing Sheets

Session Identifier A

ESTIMATION OF MOBILE DEVICE COUNT

FIELD

The following disclosure relates to a method and apparatus for estimating a number of mobile devices.

BACKGROUND

Accurate, real-time, and detailed knowledge of a population distribution is important for urban planning, advertising, navigation, and other activities. A census may give a static measurement (e.g. a snapshot) of the population at significant cost and with limited detail. However, population, especially in urban areas is not static. For example, people may live outside a city and commute into the city during the day. Residents of the city may leave the city on the weekends. The population in a city, state, or region may therefore change on an hourly or daily basis. This dynamic behavior of the population may not be captured by a static population measurement in a census.

SUMMARY

In one embodiment, a method estimation of a count of mobile devices is disclosed. The method includes receiving one or more probe data points including a location, a session identifier, and a timestamp, constructing a trajectory including the one or more probe data points having a same session identifier, calculating a trajectory duration for the trajectory based on the timestamps of the one or more probe data points, calculating a normalized trajectory from the trajectory duration and a predetermined observation duration, and estimating the count of mobile devices from at least the normalized trajectory. A path of the trajectory may be based on the location of the one or more probe data points.

In another embodiment, an apparatus for estimating a number of mobile devices is disclosed. The apparatus includes a receiver configured to receive one or more probe data points including a location, a session identifier, and a timestamp and generated by at least one mobile device, a probe data aggregator configured to construct a trajectory including the one or more probe data points having a same session identifier, a trajectory normalizer configured to calculate a trajectory duration for the trajectory based on the timestamps of the one or more probe data points and calculate a normalized trajectory from the trajectory duration and a predetermined observation duration, and a mobile device counter configured to estimate the number of mobile devices from at least the normalized trajectory duration. A path of the trajectory may be based on the location of the one or more probe data points In another embodiment, a non-transitory computer-readable medium is disclosed that includes instructions that when executed are operable to construct a trajectory including probe data having a same session identifier, calculate a trajectory duration based on timestamps of the probe data included in the trajectory, calculate a normalized trajectory from division of each trajectory duration by a predetermined duration, and determine a count of mobile devices for the predetermined duration based on a sum of the normalized trajectory.

BRIEF DESCRIPTION OF THE DRAWINGS

Exemplary embodiments of the present invention are described herein with reference to the following drawings.

DETAILED DESCRIPTION

Figure 1:
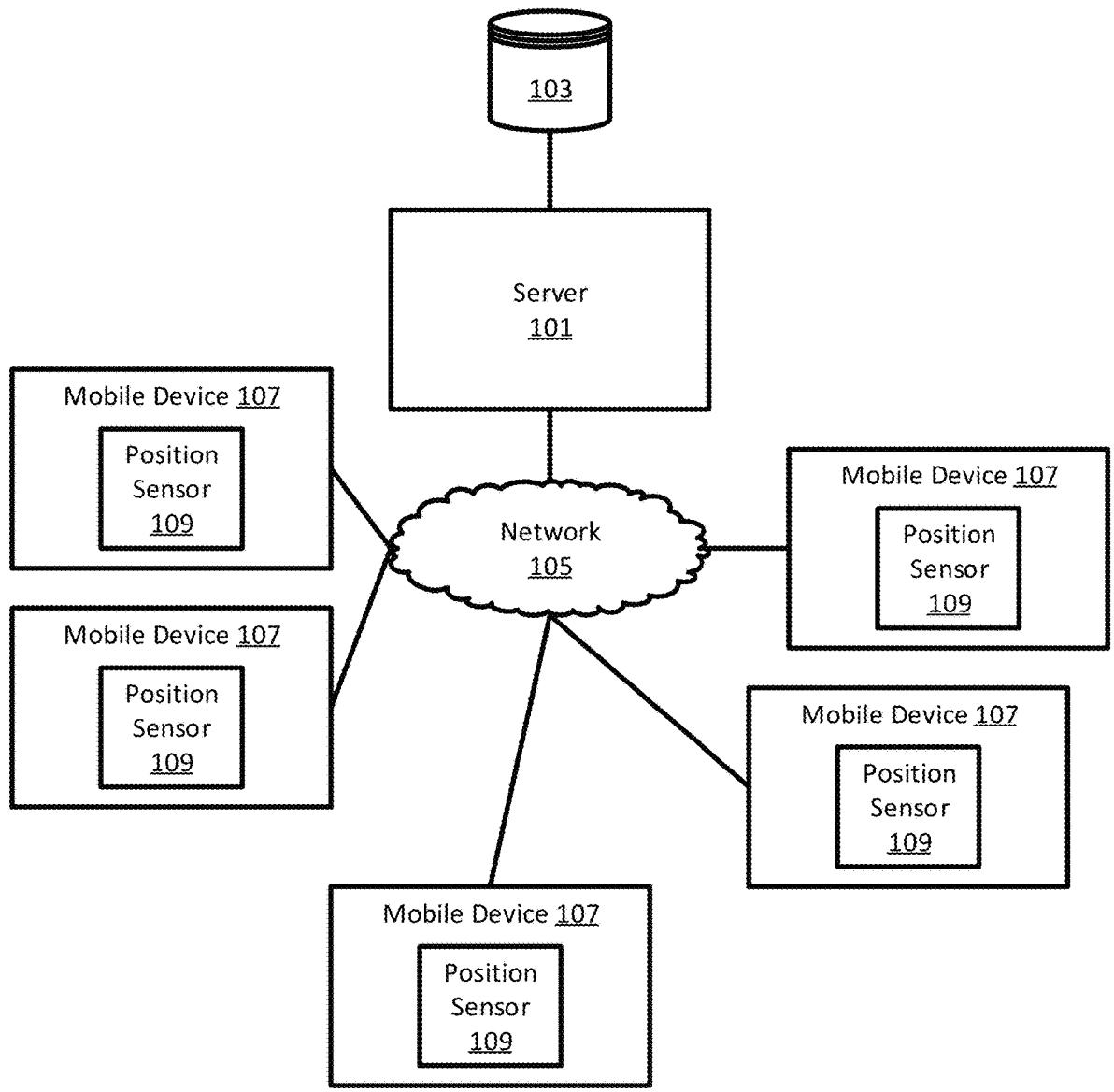
FIG. 1 illustrates an example system for generating probe data and estimating a count of mobile devices.

Mobile devices generate location data, also known as probe data. Like breadcrumbs, the mobile devices generate probe data points periodically that trace the path of the mobile device. In addition to the location data, the probe data points may also include a timestamp of when the probe data point was recorded. Different mobile devices may generate probe data points at different rates. Rather than directly identifying the mobile device, the probe data point includes an anonymous session identifier to protect the privacy of the mobile device and the user. To further protect privacy, a mobile device may change its session identifier periodically or randomly. Different mobile devices may change session identifiers in a different way.

Counting the number of mobile devices in an area may provide another tool for estimating the population. Because the number of mobile devices may be proportional to the general population, a change in the number or distribution of mobile devices can indicate a change in the general population. By estimating a count of mobile devices in an area, the human (or "general") population may be estimated. For example, if the mobile adoption rate is known (e.g. the percentage of people in an area having mobile devices or the number of mobile devices per capita), the number of mobile devices in the area may be divided by the adoption rate to estimate the population.

However, because mobile devices generate probe data with anonymous session identifiers that change over time, the probe data does not directly indicate the number of mobile devices. Because different mobile devices change session identifiers at different rates, mobile devices that switch session identifiers may be overcounted or overrepresented in the probe data. This bias toward mobile devices that switch session identifiers more frequently means that the number of unique session identifiers in the probe data may not be proportional to the number of mobile devices or to the population. Thus, the number of unique session identifiers may not be an accurate estimate of the number of mobile devices or of the population.

Additionally, because different mobile devices generate probe data points at different rates, mobile devices that generate probes more quickly or generate more probes over a given time may be overcounted or overrepresented in the probe data. This bias toward mobile devices that generate more probes or generate probes more quickly means that the number of probe data points in the probe data is not proportional to the number of mobile devices or to the population. Thus, the number of probe data points may not be an accurate estimate of the number of mobile devices or of the population. Probe data generated by mobile devices that generate probe data points at different rates and that update session identifiers at different rates may be known as heterogeneous probe data.

These biases in the probe data toward mobile devices that switch session identifiers more quickly or that generate probe data more quickly may be removed by grouping the probe data points by session identifier into a trajectory, normalizing a duration of the trajectory (e.g. the amount of time between the oldest probe data point and the youngest probe data point in the trajectory), and adding all the normalized trajectory durations together. The sum of the normalized trajectory durations provides an estimate of the number of mobile devices that generated the probe data and, thereby, the general population.

By removing bias from the probe data, the mobile device count and the population may be estimated more efficiently. Instead of frequent, costly, and static censuses, the population may be estimated from readily available probe data, thereby reducing the time, energy, and resources necessary to estimate the population. Further, by providing an estimate of the dynamic population, the population flow may be estimated, which is not measured by a census. Still further, estimating the mobile device count and the population based on the probe data may improve the operation of a processor calculating the estimate.

FIG. 1 illustrates an example system for generating probe data and estimating a count of mobile devices. A server 101 connected to a database 103 may communicate through a network 105 with one or more mobile devices 107. The mobile devices 107 may have a position sensor 109. Additional, different, or fewer components may be included.

The server 101 may be configured to receive probe data generated by position sensors 109 from the mobile devices 107 through the network 105. In some cases, the probe data may be cached or collected by another device (e.g. another server or computer) before being received by the server 101. The server 101 may store the probe data on the database 103. The server 101 may be configured to process the probe data to estimate a number of mobile devices 107 and a population. For example, the server 101 may implement the method of FIG. 9. In some cases, the server 101 may be configured to determine a traffic estimate or a navigation instruction for a vehicle, person, or mobile device 107.

The database 103 may be a geographic database. The geographic database may store information including maps and probe data generated by the mobile devices 107 and position sensors 109. The geographic database may be configured to send information such as map information to the server 101. Information stored in the database 103 may be updated by the server 101.

The network 105 may be a wired, wireless, or combination connection between the server 101 and the mobile devices 107. The network 105 may include, for example, short range radio communications, cellular links, satellite links, and cabling. The network 105 may provide for communication between the server 101 and the mobile devices 107. Data may be sent between the server 101, the mobile devices 107, and other devices through the network 105.

The mobile devices 107 may send probe data to the server 101. For example, the mobile devices 107 may periodically send the probe data or send the probe data is it is created. The mobile device 107 may send the probe data to an intermediary before the server 101.

The position sensor 109 may generate probe data including one or more measurements of the position sensor 109 at a point in time. The probe data may be generated by receiving Global Navigation Satellite System (GNSS) or Global Positioning System (GPS) signals and comparing the GNSS or GPS signals to a clock to determine the absolute or relative position of the mobile device 107. The probe data may be generated by receiving radio signals or wireless signals (e.g., cellular signals, the family of protocols known as Wi-Fi or IEEE 802.11, the family of protocols known as Bluetooth, or another protocol) and comparing the signals to a pre-stored pattern of signals (e.g., a radio map). The mobile device 107 may act as the position sensor 109 for determining the position, or the mobile device 107 and the position sensor 109 may be separate devices.

Figure 2:
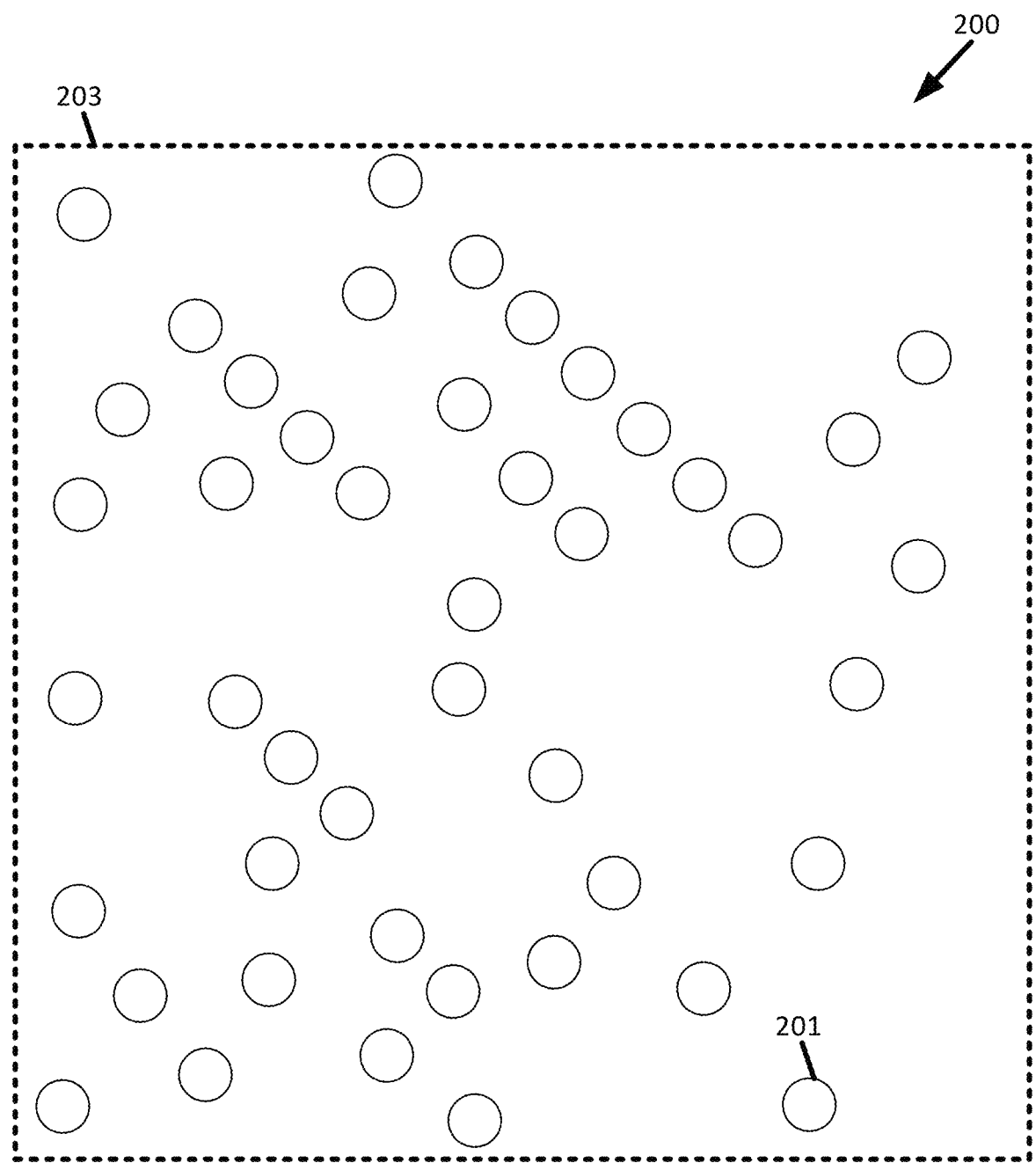
FIG. 2 illustrates probe data points.

FIG. 2 illustrates probe data. The probe data 200 may include one or more probe data points 201 (represented as circles). The probe data points 201 may be distributed over an area 203.

The probe data 200 may be generated by one or more mobile devices. The probe data may include one or more probe data points 201 generated by the one or more mobile devices. Probe data 200 from the mobile devices may be aggregated over a geographic area 203 and/or over a duration. For example, the data 200 may be collected for a block, neighborhood, city, state, or country. In another example, the data may be aggregated over 10 minutes, an hour, a day, or a week.

The probe data points 201 may include a timestamp of when the probe data point 201 was created by the mobile device (or a position sensor of the mobile device). The time stamp may allow for determining an amount of time elapsed between two probe data points. For example, the difference between a timestamp of a first probe data point 201 and a second probe data point 201 may be an amount of time elapsed between the generation of the first probe data point 201 and the generation of the second probe data point 201.

The probe data point 201 may include a location of the mobile device and/or a session identifier. The location may include a geographic coordinate of the location of the mobile device or position sensor when the probe data point 201 was generated. For example, the location may include a latitude and longitude. The session identifier may be an identifier of the series of probe data points 201 produced by the mobile device. Depending on the mobile device and the mobile service provider, the session identifier may change every half hour, every hour, or another period of time. The same mobile device may therefore generate probe data points 201 using more than one session identifier. For example, the mobile device may generate one or more probe data points using a first session identifier and then, after the first session identifier has expired, use a second session identifier to produce further probe data points 201.

The area 203 may correspond to a geographic boundary within which the probe data points 201 are located. For example, the area 203 may correspond to a block, neighborhood, city, state, or country. Though the exemplary area 203 shown in FIG. 2 is a square, the area 203 may have any shape.

Figure 3:
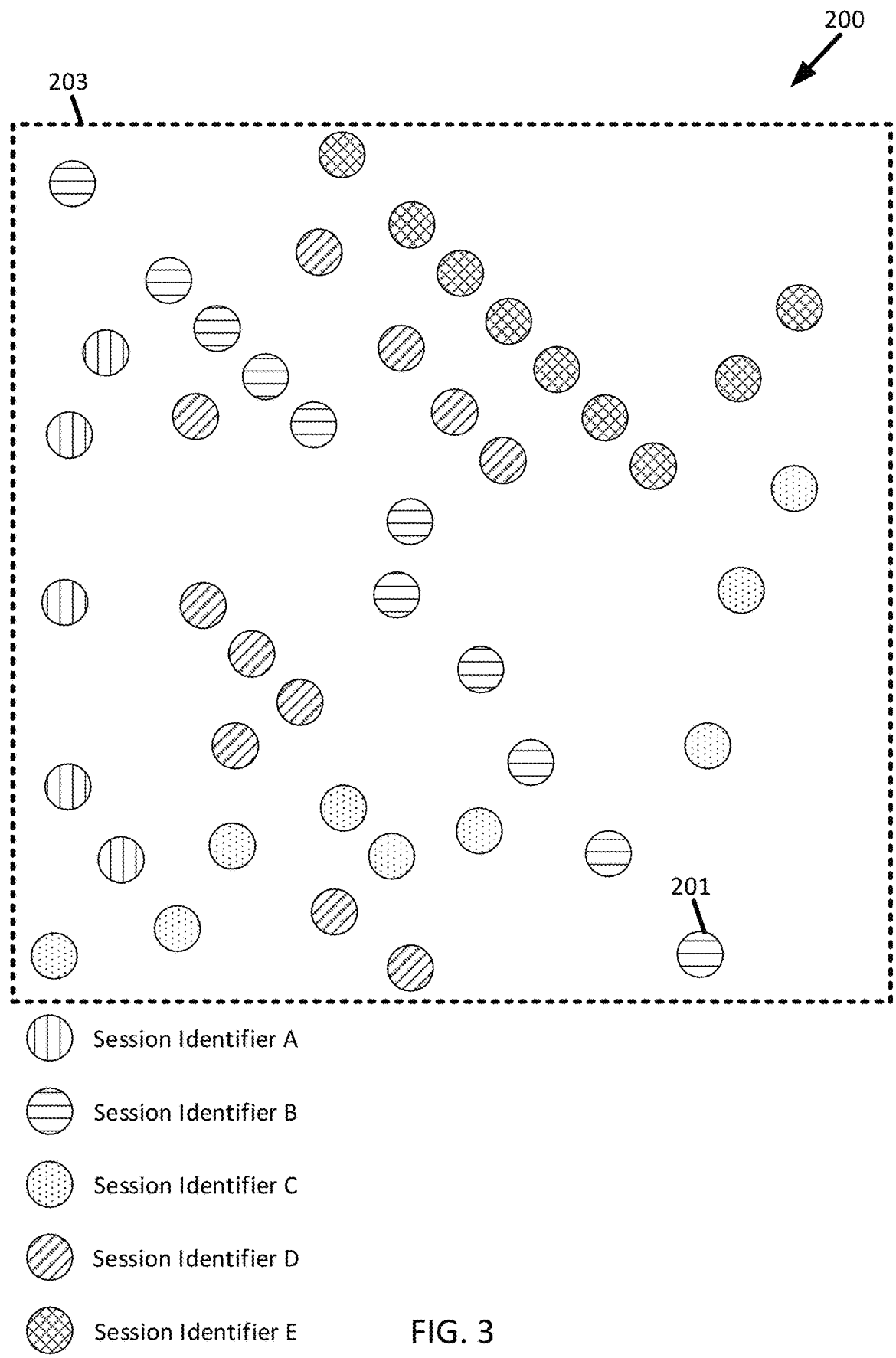
FIG. 3 illustrates probe data points grouped by a session identifier.

FIG. 3 illustrates probe data points 201 grouped by a session identifier. The probe data points 201 have been filled with a pattern, such that the probe data points 201 having a same pattern also have a same session identifier. Though FIG. 3 shows the common session identifiers graphically, the probe data points may be grouped according to a shared session identifier without a graphical representation.

Figure 4:
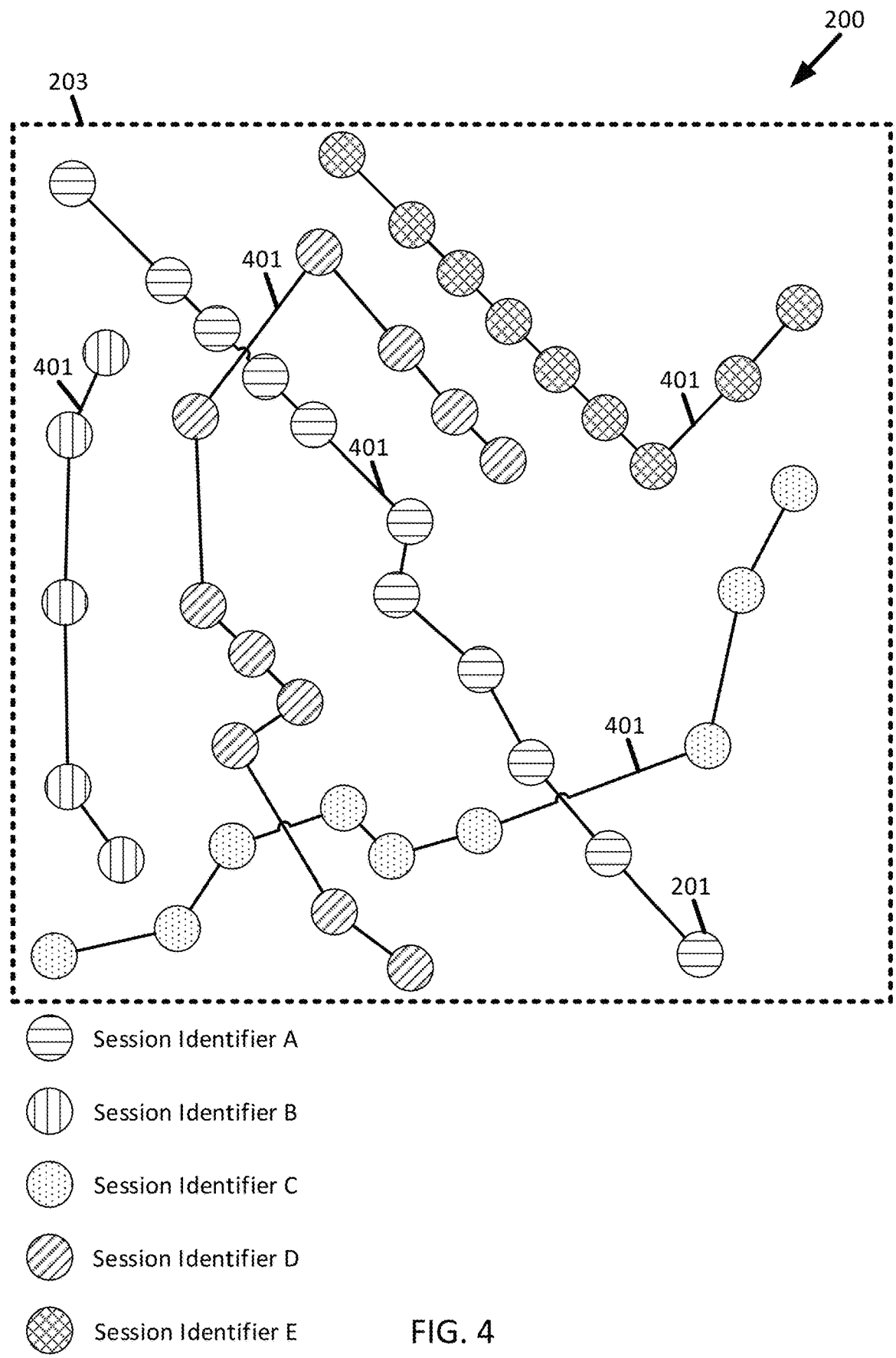
FIG. 4 illustrates trajectories of probe data points.

FIG. 4 illustrates trajectories 401 of probe data points 201. The trajectories 401 are groups of one or more probe data points 201 having the same session identifier. In the example illustrated in FIG. 4, the probe data points 201 have been grouped into five trajectories A-E. In a trajectory 401, the probe data points 201 may be ordered sequentially according to the timestamps. For example, the trajectories 401 may be ordered from newest to oldest or from oldest to newest probe data point 201. The trajectories 401 may trace a path of the mobile device or position sensor while generating the probe data points 201.

Figure 5:
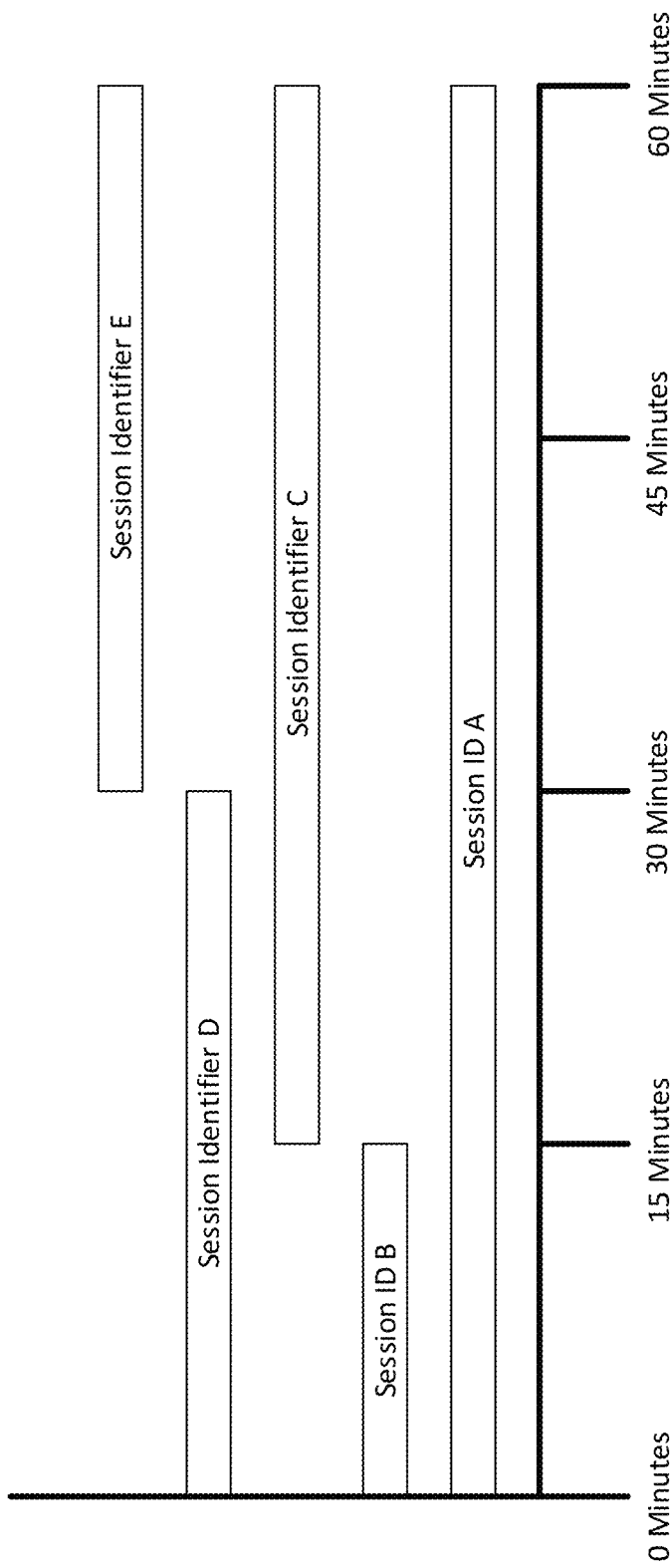
FIG. 5 illustrates a normalized trajectory.

FIG. 5 illustrates a normalized trajectory. FIG. 5 shows the duration of each of the trajectories plotted on a graph. In this example, the x-axis ranges from a duration of 0 to a duration of 60 minutes. Other durations within or outside of that range are possible. In order to remove bias caused by differing rates at which different mobile devices change session identifiers, the duration of each trajectory is divided by a time bin or observation duration. For example, probe data points within an hour wide observation duration are grouped into trajectories. The duration of a trajectory may be the difference in time between a timestamp of the oldest probe data point in the trajectory and the newest probe data point in the trajectory. The trajectory may be normalized by dividing the trajectory duration by the observation duration. For example, where the observation duration is one hour, and where a trajectory duration is 45 minutes, the normalized trajectory duration is 0.75. The normalization process thereby removes any bias in the probe data caused by differing rates of mobile devices changing the session identifier. For example, where a mobile device, over the course of an observation window of an hour, generates probe data using a first session identifier for 45 minutes and generates probe data using a second session identifier for 15 minutes, the first trajectory including the first probe data will have a normalized duration of 0.75, and the second trajectory including the second probe data will have a normalized duration of 0.25. Taken together, the first and second trajectories add up to 1, accurately reflecting that the first and second trajectories were generated by a single device, not two devices (which would be the outcome if the number of unique session identifiers was taken as representing the number of mobile devices).

Figure 6:
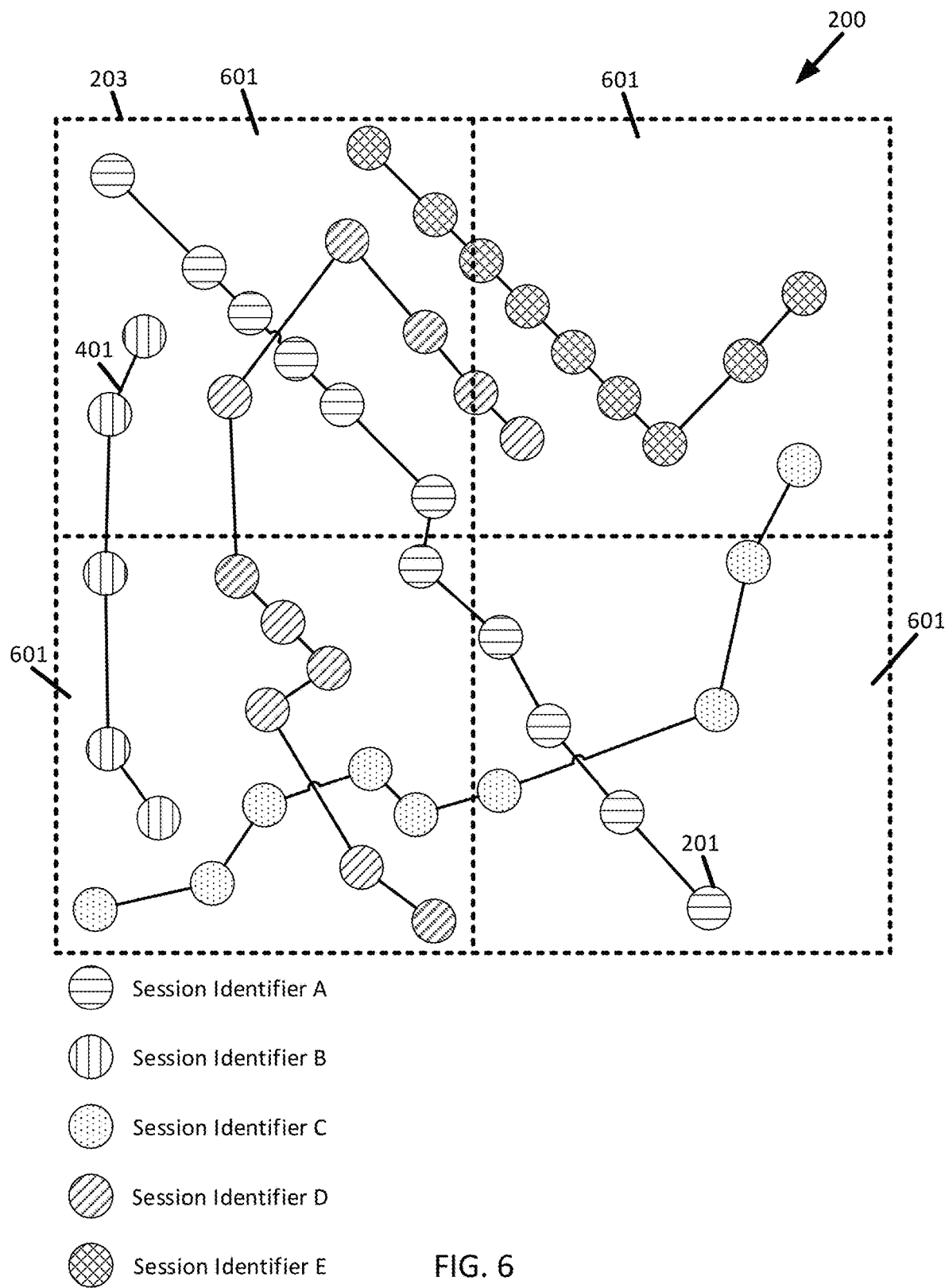
FIG. 6 illustrates trajectories crossing boundaries.

FIG. 6 illustrates trajectories crossing boundaries. The area 203 may be divided into one or more observation areas 601. The observation areas 601 may correspond to a block, neighborhood, city, state, or country. Additionally or alternatively, the observation areas 601 may have correspond to an area delineated by latitude and longitude. The count or number of mobile devices may be estimated within an observation area 601. However, a trajectory may contain probe data points located in more than one observation area 601; the trajectory 401 may cross a boundary from one observation area 601 into another. When a trajectory 401 is present in more than one observation area 601, the number of mobile devices determined by counting unique session identifiers may double count (or triple count if a trajectory 401 is present in three observation areas 601, and so on) the trajectory, thereby biasing the estimated population or number of mobile devices. Normalizing the trajectory can correct or prevent such a bias. For example, the trajectory may be expanded by a radius and the resultant area around the trajectory normalized over an observation area.

Figure 7:
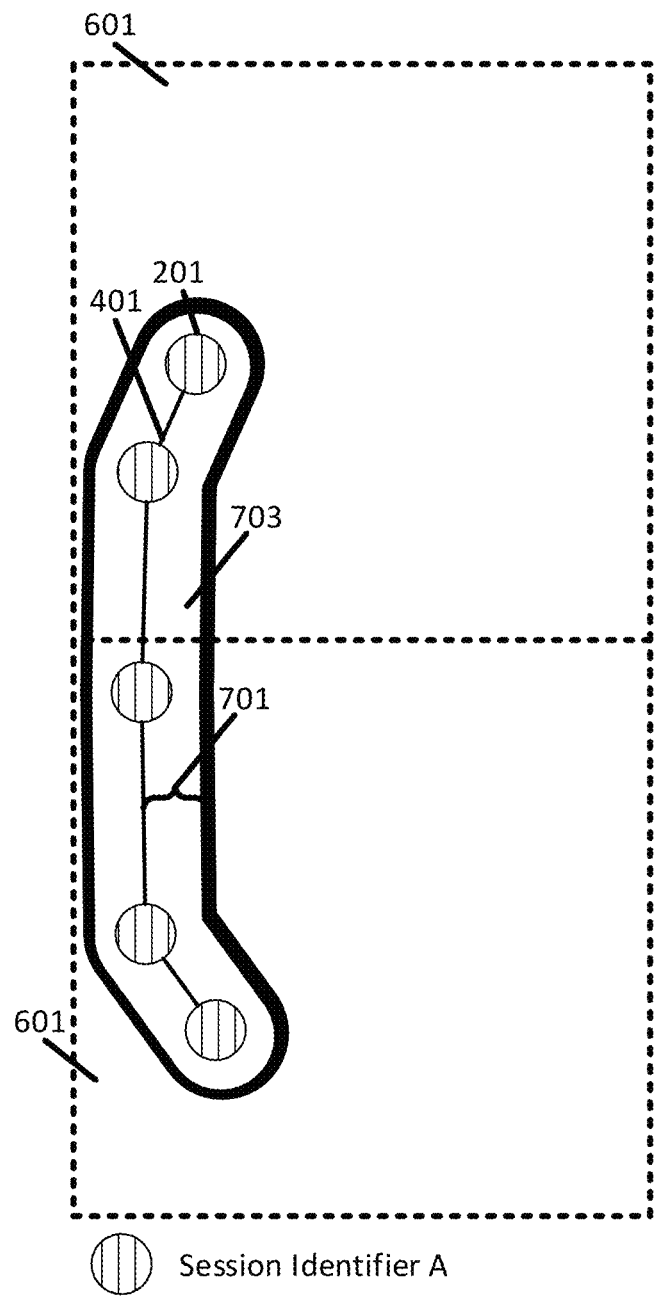
FIG. 7 illustrates expanding a path of a trajectory.

FIG. 7 illustrates expanding a path of a trajectory 401. The trajectory path may be expanded as part of normalizing the trajectory 401. A radius 701 may expand the path. The expanded path may have an area 703.

The radius 701 expands the path of the trajectory 401. The value of the radius may be chosen or predetermined based on an accuracy of location information of the probe data points 201 in the trajectory 401. In some cases, the radius may be based on a horizontal accuracy of the probe data point. The horizontal accuracy may be an accuracy of the GNSS or GPS system used to determine the location of the mobile device or position sensor that generated the probe data point. For example, the radius 701 may be 1 meter or 5 meters. The accuracy may be a predetermined value set by a managing entity. For example, the U.S. government currently maintains a 4 meter root-mean-squared accuracy which corresponds to 7.8 meter range with 95% confidence interval.

The accuracy may be determined at the mobile device 107 from a GNSS signal. For example, the accuracy value may be encoded in the GNSS signal and identified by the mobile device 107. The accuracy may be calculated from the GNSS signal or from a comparison of multiple GNSS signals. The accuracy may depend on a number of satellites in communication with the mobile device or position sensor that generated the probe data points, a strength of a signal received from the satellites, and weather or atmospheric conditions. In some other cases, the radius may be based on a speed of the mobile device or position sensor. The radius 701 may define an outer boundary of the area 703.

The area 703 may be centered on the path of the trajectory. For example, the area may expand at the distance of the radius 701 from connections between the probe data points included in the trajectory 401. For trajectories 401 that traverse a boundary between two or more observation areas 601, the area 703 may be present in two or more observations areas 601. The portion of the area 703 present in each observation area 601 may be normalized based on the area of the observation area 601.

Figure 8:
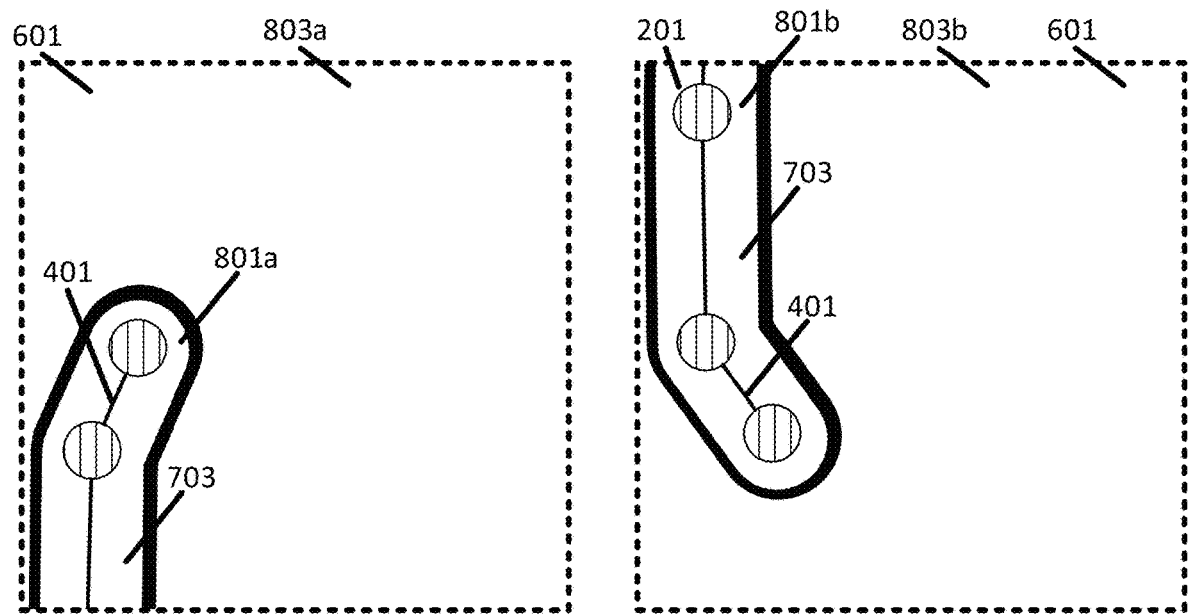
FIG. 8 illustrates normalizing a trajectory area.
Figure 8:

FIG. 8 illustrates normalizing a trajectory area 801. The area 703 around the trajectory 401 may be divided into portions 801a, 801b present in an observation area. When the area of the portions or of the trajectory area is unknown, the area may be determined. For example, the area may be approximated by one or more geometric shapes. The area of the shapes may be summed to approximate the area of the trajectory area. In another example, the area may be determined graphically. The area of the portions 801a, 801b may be normalized over an area 803a, 803b. Though the trajectory 401 shown is divided into two portions 801a, 801b present in two observation areas 601, a trajectory may be divided into more than two portions when the trajectory is present in more than two observation areas.

In one example, the area of each portion 801a, 801b is normalized by dividing the trajectory areas 801a, 801b over the area 803a, 803b of the observation areas. In this example, the first trajectory area or portion 801a has an area of 20 square meters and the first observation area has an area 803a of 100 square meters. Taking the area 801a as the numerator and the area 803a as the denominator, the resultant normalized trajectory area for the first portion 801a is 0.2. In this example, the second trajectory area or portion 801b has an area of 30 square meters and the second observation area 601 has an area 803b of 100 square meters. Taking the area 801b as the numerator and the area 803b as the denominator, the resultant normalized trajectory area for the first portion 801b is 0.3. In some cases, the normalized trajectory duration may be combined with the normalized trajectory areas to normalize a trajectory on the basis of duration and area. For example, the normalized trajectory area may be multiplied by the normalized trajectory duration.

Figure 9A:
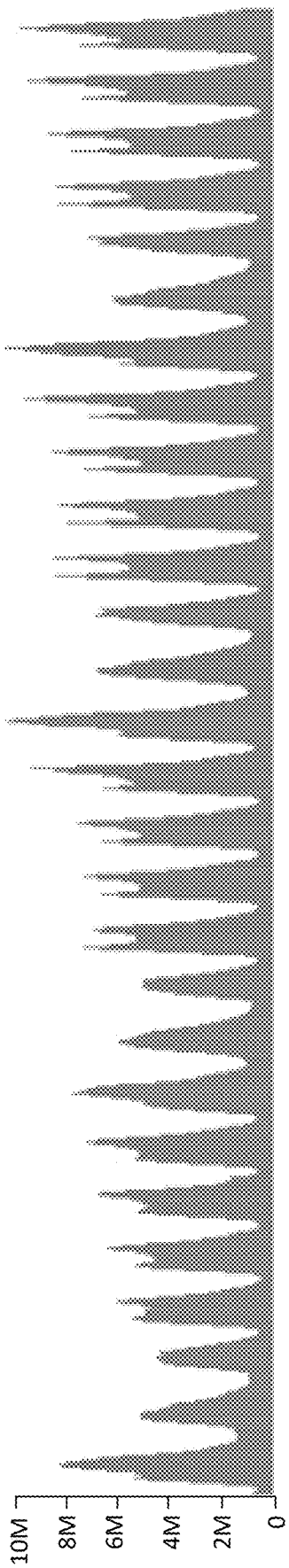
FIGS. 9a and 9b illustrate estimating a count of mobile devices.
Figure 9B:
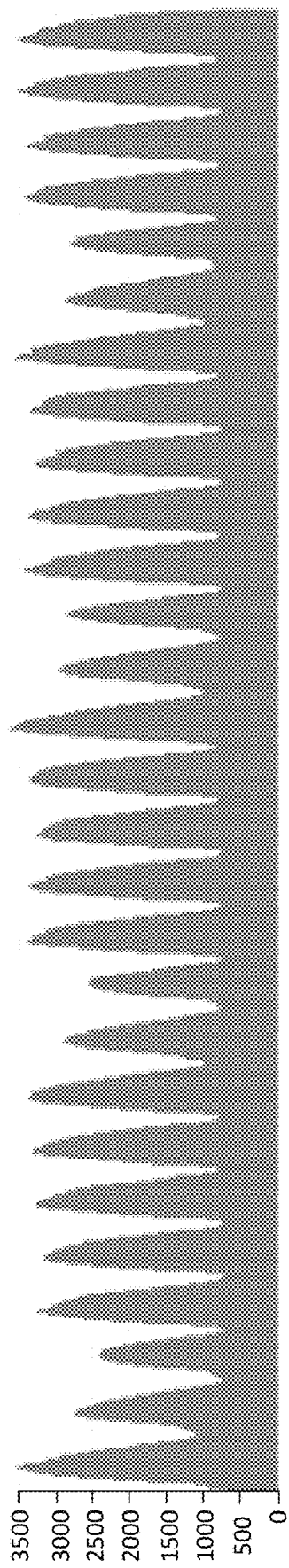

FIGS. 9a and 9b illustrate estimating a count of mobile devices. Both FIGS. 9a and 9b are based on probe data points collected in Berlin, Germany, with the count of mobile devices estimated for each hour during the month of February.

FIG. 9a is a graph of an estimate of the count of mobile devices based on probe data, without normalizing the data to remove bias. The x axis is time through the month of February and the y axis is the number of mobile devices, in millions. The minimum count of mobile devices is around 0.5 million and the maximum count of mobile devices is around 10 million. The ratio between the highest count and the lowest count is known as the "peak-to-valley ratio." The peak-to-valley ratio in FIG. 9a is 20, meaning that the estimated peak number of mobile devices during the month is nearly 20 times that of the low number of mobile devices. Though the population is dynamic (e.g. people commute into the city during the day and leave at night), a peak-to-valley ratio of 20 is much higher than other estimates of the count of mobile devices using other data. Assuming that the dynamic population in berlin is proportional to the mobile device counts, it is unrealistic to conclude that the population of Berlin in the daytime is 20 times higher than the population at daytime. The increased peak-to-valley ratio is due to the bias present in the probe data. Further, the mobile device count changes significantly in a short amount of time, which would be hard to attribute to the rapid movement of the population.

FIG. 9b is a graph of an estimate of the count of mobile devices based on probe data that has been normalized to remove bias toward mobile devices that generate more probe data points or that cross observation data. The x axis is time through the month of February 2019 and the y axis is the number of mobile devices, in thousands. The peak-to-valley ratio in FIG. 9b is between 4 and 5, meaning that the highest estimated number of mobile devices is 4 to 5 times the low number of mobile devices. This lower peak-to-valley ratio (as compared to the peak-to-valley ratio of FIG. 9a) is confirmed by other methods of estimating population and number of mobile devices. By removing the bias present in the probe data toward mobile devices that produce more probe data, that change session identifiers more quickly, and/or that cross boundaries, the probe data may be used to accurately estimate the population. Further, by normalizing the probe data, jitters in the time domain of the mobile device count are reduced. This is shown by comparing the smoother profile of the mobile device counts in FIG. 9b against the sharper profile of the mobile device counts in FIG. 9a.

Figure 10:
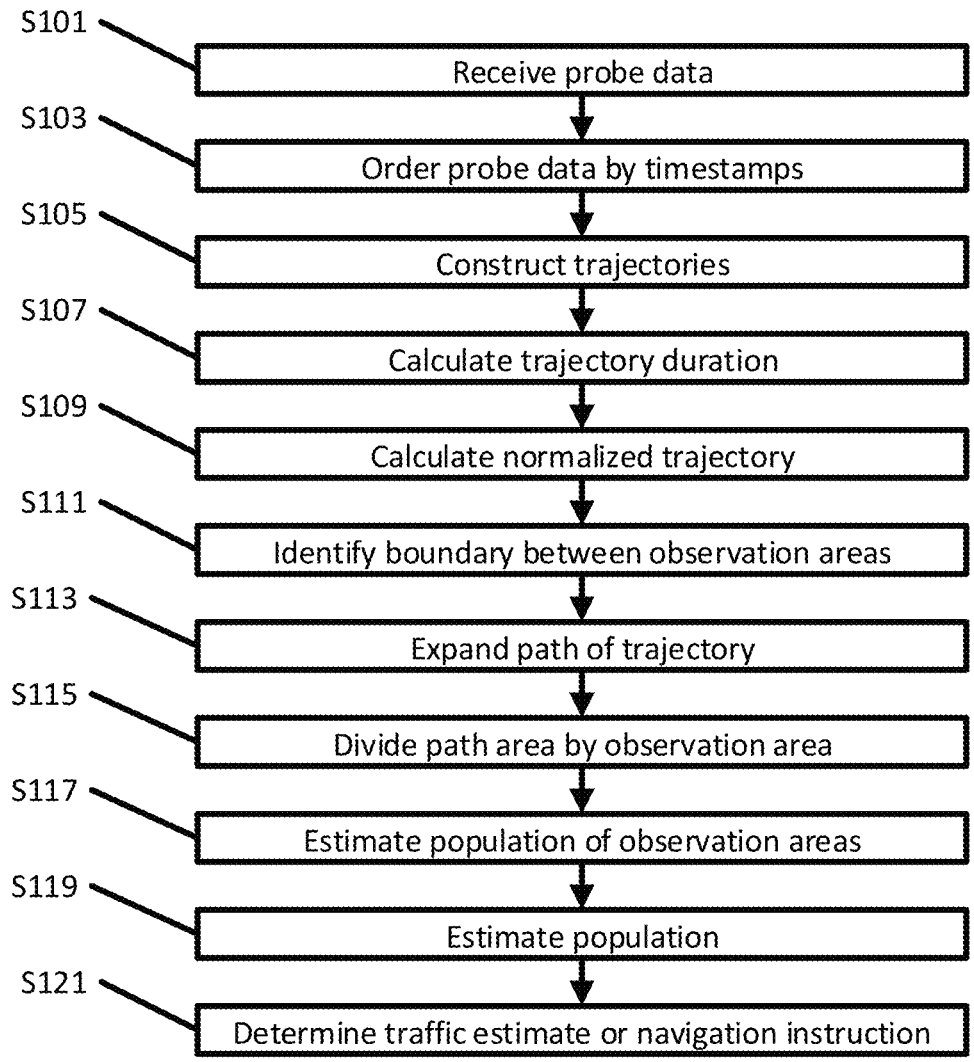
FIG. 10 illustrates an example flowchart for estimating a count of mobile devices.

FIG. 10 illustrates an example flowchart for estimating a count of mobile devices. Additional, different, or fewer acts may be provided. For example, acts S111, S113, and S115 may not be performed. The acts may be performed in any order. For example, acts S111, S113, and S115 may be performed before act S109. In another example, act S105 is performed before act S103. The acts of FIG. 10 may be performed by the server 101 in communication with the geographic database 103.

In act S101, the probe data is received. The probe data may include one or more probe data points. One or more mobile devices may generate the probe data points. The mobile devices may create the probe data points at different rates. The probe data points may include one or more of a location, a timestamp, and a session identifier. The location may be a geographic or global positioning coordinate. For example, the location may be a GPS or GNSS coordinate. The location may include a latitude and a longitude. The session identifier may be unique to the mobile device that generated the probe data point. However, the identity of the mobile device may be unknown. For example, the receiver of the probe data (e.g. the server) may not know the identities of the one or more mobile devices that generated the probe data. The mobile devices may change or update a session identifier at different rates.

In act S103, the probe data points may be ordered according to timestamps. Ordering the probe data points by timestamps may allow for trajectories to be formed which include the probe data points in sequential or chronological order. In this way, the path of a mobile device generating the probe data points may be found. In some cases, the probe data points may be first grouped according to the session identifier or included in trajectories according to a shared session identifier before being ordered according to the timestamps.

In act S105, one or more trajectories may be constructed from the probe data points. This may be shown, for example, in FIG. 4. A trajectory may include probe data points having the same session identifier. In some cases, the probe data points in a trajectory may be ordered according to the timestamps. For example, the probe data points may be ordered sequentially from oldest to newest or from newest to youngest. Thus, by collecting the probe data points, the trajectory may trace a path of a mobile device generating the probe data points. The path of the trajectory may be based on the locations of the probe data points included in the trajectory. For example, the path may pass through the locations of the one or more probe data points in the trajectory in order from oldest to newest probe data point based on the timestamps.

In act S107, a trajectory duration is calculated. The trajectory duration may be determined based on the timestamps of the probe data points included in the trajectory. For example, the duration may be the difference between the timestamp of the oldest probe data point and the timestamp of the newest probe data point in the trajectory. The difference may be found by subtracting the timestamps. The duration may represent an amount of time elapsed between the generation of the oldest and the newest probe data point by a mobile device.

In act S109, a normalized trajectory may be calculated for a trajectory. This may be shown, for example, in FIG. 5. The normalized trajectory may be determined based on the trajectory duration and a predetermined observation duration. For example, in FIG. 9, the observation duration is one hour (though the count was estimated for each hour in February using multiple sets of probe data). The normalized trajectory may be calculated by dividing the trajectory duration by the observation duration. Where the observation duration is an hour and the trajectory duration is also an hour, the normalized trajectory is 1. This corresponds to a session identifier spanning the entire observation duration. Because a mobile device may switch session identifiers but generates probe data with a single session identifier at a time, a normalized trajectory of 1 indicates that the mobile device did not switch session identifiers during the observation duration. In another example, a mobile device generates probe data for 15 minutes with a first session identifier and for 45 minutes with a second session identifier during the observation duration. The probe data points having the first session identifier, once grouped into a first trajectory, will have a trajectory duration of 15 minutes, and the probe data points having the second session identifier, once grouped into a second trajectory, will have a trajectory duration of 45 minutes. Where the observation duration is an hour, the first normalized trajectory will be 0.25 and the second trajectory duration will be 0.75. Taken together, the first and second trajectories add up to 1. This means that though the mobile device switched session identifiers during the observation duration, the session identifiers still add up to one device. Without normalization, the number of unique session identifiers is counted as being representative of the number of mobile devices. The mobile device that switched session identifiers during the observation duration would count as two mobile devices because the mobile device used two session identifiers. By normalizing the trajectories, the bias toward mobile devices that switch session identifiers more quickly is removed.

In act S111, a boundary between a first observation area and a second observation area is identified. This may be shown, for example, in FIG. 6. Trajectories that cross observation boundaries may be a source of bias in the probe data. For example, a trajectory that is present in two observation areas (e.g. crosses the boundary between the two observation areas) will include probe data points in both observation areas. Within each observation area, the same session identifier (and same trajectory and mobile device) will count as a separate trajectory, session identifier, and mobile device in both observation areas, thereby biasing any population or count estimate based on the probe data points in the observation areas. Identifying trajectories that cross boundaries and normalizing the cross-boundary trajectories may remove bias from population and count estimates.

In act S113, a path of a trajectory is expanded. This may be shown, for example in FIG. 7. When a trajectory is identified as crossing a boundary between two (or more) observation areas, a radius may expand the path of the trajectory. Expanding the trajectory by the radius results in a trajectory area being created around the trajectory. The radius may be based on an accuracy of the location information contained in the probe data points present in the trajectory. For example, the radius may be determined based on a horizontal accuracy of a global positioning signal used to generate the location information present in the probe data points. The accuracy may depend on a number of satellites in communication with the mobile device or position sensor, signal strength, and atmospheric conditions. The radius may be 1 meter, 5 meters, or another value.

Once expanded, the area of the trajectory area may be determined. For example, the area may be approximated by a combination of one or more geometric shapes. The area of the shapes may be summed to approximate the area of the trajectory area. In another example, the area may be determined graphically. In a further example, In act S115, a portion of the trajectory area is divided by the observation area. This may be shown, for example, in FIG. 8. Dividing the portion of a trajectory area in an observation area by the area of that observation area normalizes the trajectory area. For example, a trajectory is present across a first and a second observation area, such that a first portion of the trajectory area of the trajectory is present in the first observation area and a second portion is in the second observation area. The area of the first portion may be divided by the area of the first observation area, resulting in a first normalized trajectory area, and the area of the second portion may be divided by the area of the second observation area, resulting in a second normalized trajectory area.

In act S117, the number of mobile devices in the observation areas may be estimated. The estimate may be based on the normalized trajectory areas in the observation areas. For example, where a trajectory has been normalized to have a first normalized trajectory area in a first observation area and a second normalized trajectory area in a second observation area, the estimate of the number of mobile devices in the first observation area may be based on the first normalized trajectory area and the estimate of the number of mobile devices in the second observation area may be based on the second normalized trajectory area.

In act S119, the count of mobile devices is estimated. The count may be estimated based on the normalized trajectory. In some cases, the count is estimated on the number of mobile devices in one or more observation areas or normalized trajectory areas. The sum of the normalized trajectories or of the normalized trajectory areas may give a number of mobile devices in an area (such as over one or more observation areas) and/or over a time period (such as over one or more observation periods). The count may be determined based on the number of mobile devices. For example, the number of mobile devices may be divided by the adoption rate (or the number of mobile devices per capita) to estimate the general population.

In act S121, a traffic estimate or a navigation instruction may be determined based on the number of mobile devices or the population. For example, once the population or count has been determined for a particular path (e.g. a road), a traffic estimate may be determined for the road. A portion or a link of a road topology may be selected. The road topology may be stored in a database. In some cases, the road topology may be retrieved from the database. The population for the portion or the link may be determined. For example, the probe data points may be collected that correspond to the path and the population estimated according to one or more of acts S101-S119 above. In another example, the population may be determined for a broader area and filtered to determine the population corresponding to the path. A traffic classification or label may be determined based on the population corresponding to the link or path. In some cases, the population or count may be compared to historical data for the path to determine whether the current traffic (e.g. the current population or number of mobile devices traversing the path) is normal, below normal, or above normal for the path. The traffic classification or label may be determined based on historical data. The database may be updated with the traffic classification or label. A request for a traffic report may be received that corresponds to the link or portion of the road topology. The request may be filled by sending the traffic classification or label for the link or portion of the road topology.

A navigation instruction may be determined based on the population or mobile device count. A navigation request may be received from a vehicle or mobile device. The request may correspond to one or more links of a road topology. In some cases, the request may include a current position and a destination for the vehicle or mobile device. A navigation instruction may be determined based on the navigation request. For example, the navigation instruction may include a path having one or more links of the road topology for navigating the vehicle or mobile device from the current position to the destination. Because a road topology may include many links, multiple paths between the current position and the destination may be available. A path may be chosen based on the estimated population. The population may be associated with one or more links in the road topology. The path may be determined based on the links that avoid the population. In some cases, the path may be determined such that the links in the path are the most populous. The navigation instruction may be sent to the autonomous vehicle or mobile device. The mobile device or autonomous vehicle may navigate based on the navigation instruction. For example, based on the instruction, an autonomous vehicle may navigate toward or away from a densely populated area. In one example, a navigation instruction is determined to steer an autonomous vehicle (e.g. a drone) toward a densely populated area in order to photograph the population. In another example, a navigation instruction is determined to direct a drone to safely land away from a densely populated area. Landing in a less populated area may increase the chances of a safe landing, especially in the case of a malfunction of the autonomous vehicle. In a further example, an autonomous car navigates on one or more roads to reach a destination according to the navigation instruction.

An urban planning project may be planned based on the estimated population or mobile device count. For example, infrastructure may be planned or built according to the population or mobile device count. Wireless service towers, for example, may be constructed at locations servicing where the mobile devices are located. In another example, public transit or road projects may be implemented based on the population. The dynamic population or mobile device count may indicate a need for additional busses, ferries, trains, trams, bike lanes, or roads in an urban area or between areas. In a further example, housing development, zoning, and utilities may be planned to service the population. By estimating the population based on mobility data captured recently, the population estimation is up to date for the urban planning, whereas censuses may be quickly outdated.

Figure 11:
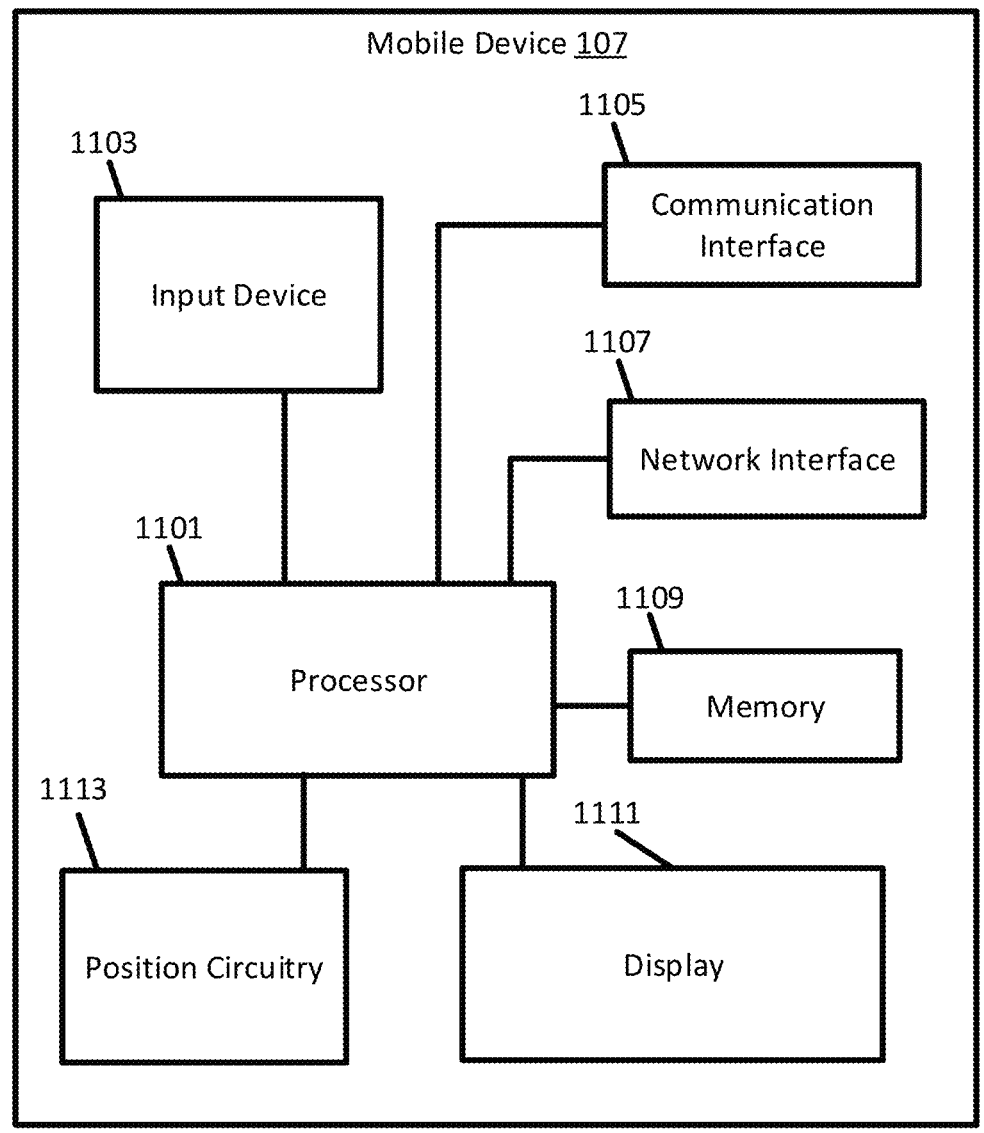
FIG. 11 illustrates an example mobile device.

FIG. 11 illustrates an example mobile device 107. The system may include a mobile device 107, for example, as described in FIGS. 1 and 6. The mobile device 107 may include a processor 1101, an input device 1103, a communication interface 1105, a network interface 1107, a memory 1109, a display 1111, and a position circuitry 1113. Different or fewer components may be present. For example, the mobile device 107 may not include position circuitry 1113. In another example, the network interface is part of the communication interface 1105.

The processor 1101 may be a general processor or application specific integrated circuit. The processor 1101 may retrieve or receive instructions stored in the memory 1109 and execute the instructions.

The input device 1103 may be used for interacting with the mobile device 107 or to change settings of the mobile device 107. For example, the input device 1103 may be used to interact with an application of the mobile device 107, such as a mapping or navigation application. In another example, the input device 1103 may be used to specify a setting of the position circuitry 1113. The input device 1103 may be used to specify the interval at which the position circuitry measures a location of the mobile device 107. In another example, the input device 1103 may be used to trigger generation of a probe data point.

The communication interface 1105 may provide for the exchange of information between the mobile device 107 and outside systems. For example, the communication interface 1105 may form a connection to one or more position sensors or other sensors that are external to the mobile device 107. In another example, the communication interface may form a connection between the mobile device and a vehicle. In this way, the mobile device may send and receive data to the sensors and vehicles external to the mobile device. For example, the mobile device may receive location information from a position sensor that is part of the vehicle.

The network interface 1107 may form a connection to the network 105. For example, the network interface 1107 may be coupled with antennas for transmitting and receiving data. In some cases, the network interface 1107 forms a connection to the network 105. In this way, the network interface 1107 may allow for the exchange of data between the mobile device 107 and the server 101 or the database 103. In some cases, the network interface 1107 may be a part of the communication interface 1105.

The memory 1109 may be a volatile memory or a non-volatile memory. The memory 1109 may include one or more of a read only memory (ROM), random access memory (RAM), a flash memory, an electronic erasable program read only memory (EEPROM), or other type of memory. The memory 1109 may be removable from the mobile device 107, such as a secure digital (SD) memory card. The memory 1109 may store instructions to cause the processor 1101 to perform one or more acts. For example, the memory 1109 may store instructions to perform the acts of FIG. 10. The memory may be configured to store location information from the position circuitry 1113 or a positioning sensor.

The display 1111 may be a liquid crystal display (LCD) panel, light emitting diode (LED) screen, thin film transistor screen, or another type of display. An output interface of the display 1111 may also include audio capabilities, or speakers. The display 1111 may indicate a status or other information about the mobile device 107, the positioning circuitry 1113, or a positioning sensor in communication with the mobile device 107. The display 1111 may display mapping or navigation information. For example, a navigation or mapping application on the mobile device 107 may use the display to present mapping or navigation information.

The position circuitry 1113 may be a positioning sensor. For example, the position circuitry may use GPS or GNSS to measure its location. In some cases, the position circuitry 1113 may be remote from the mobile device 107. The position circuitry 1113 may communicate with the processor 1101 directly or through one or more intermediaries. For example, the position circuitry may communicate with the processor 1101 of the mobile device 107 through the communication interface 1105. The position circuitry 1113 may measure a location of the mobile device 107. In some cases, the position circuitry 1113 measures the location of the mobile device 107 periodically or at a predetermined interval. The position circuitry 1113 may be configured to send the measured location to the mobile device 107, for example to the processor 1101. The location information generated by the position circuitry 1113 may be sent to the server 101.

Figure 12:
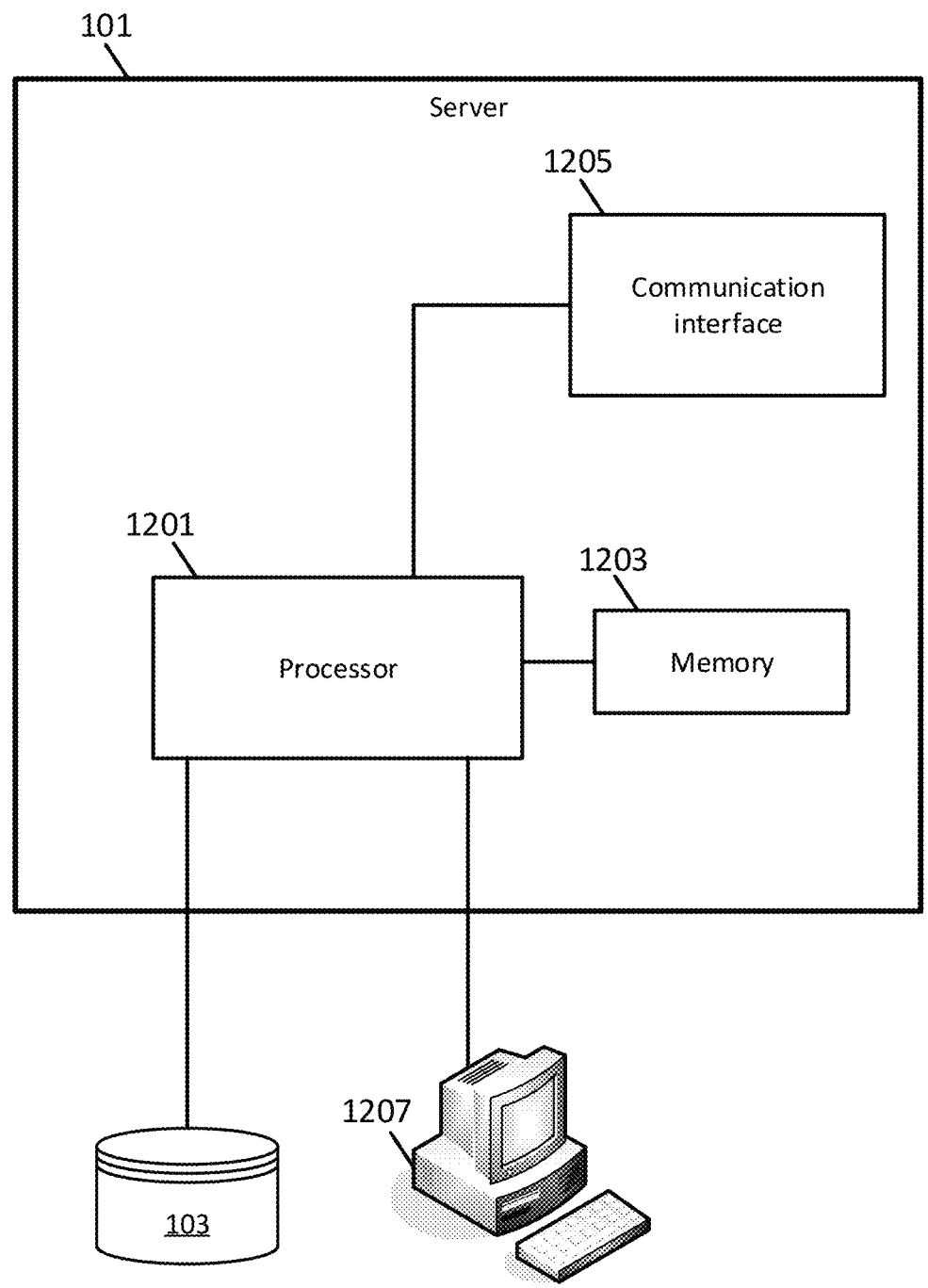
FIG. 12 Illustrates an example server.

FIG. 12 Illustrates an example server. The server 101 may be the server 101 of FIG. 1. The server 101 may include a processor 1201, a memory 1203, a communication interface 1205, and an input device 1207. The server 101 may be in communication with a database 103.

The processor 1201 may be a general processor or application specific integrated circuit. The processor 1201 may retrieve or receive instructions stored in the memory 1203 and execute the instructions. For example, the processor 1201 may be configured to perform the acts of FIG. 10.

The memory 1203 may be a volatile memory or a non-volatile memory. The memory 1203 may include one or more of a read only memory (ROM), random access memory (RAM), a flash memory, an electronic erasable program read only memory (EEPROM), or other type of memory. The memory 1203 may be removable from the server 101, such as a secure digital (SD) memory card. The memory 1203 may store instructions to cause the processor 1201 to perform one or more acts. The memory may be configured to store location information from the position circuitry 1113 or a positioning sensor.

The communication interface 1205 may provide a connection between the server 101 and the network 105. In some cases, the communication interface 1205 may facilitate the receipt of the location information (e.g. probe data) from the mobile device 107, a positioning sensor, or a vehicle.

The input device 1207 may be a keyboard, terminal, or personal computer. The input device may be used to enter or modify settings of the server 101. For example, the setting may include an observation duration and/or one or more observation areas.

The database 103 may be directly connected to the server 101 or accessible through a network 105. For example, the server 101 may communicate with the database 103 through the communication interface 1205. In some cases, the database may be stored in the memory 1203. The database 103 may be configured to store location information such as probe data.

Figure 13:
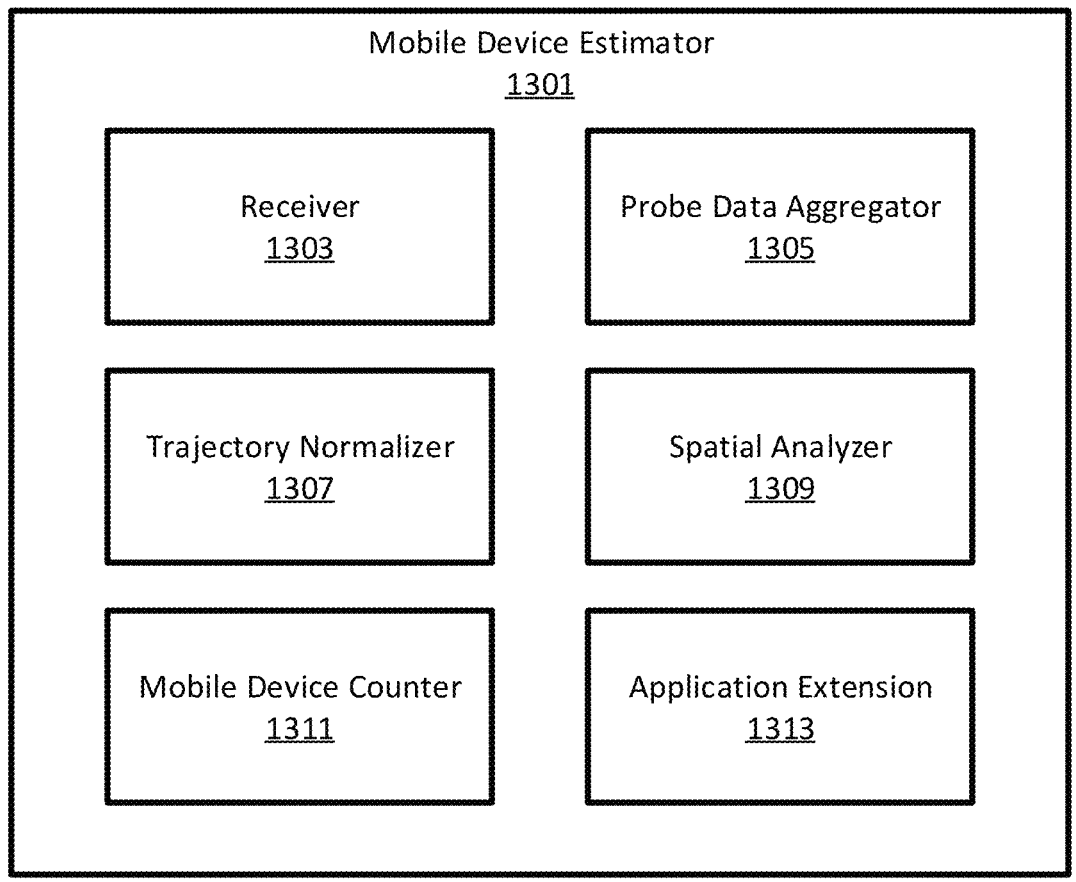
FIG. 13 illustrates an example system for estimating a count of mobile devices.

FIG. 13 illustrates an example system for estimating a count of mobile devices. The system may include a mobile device estimator 1301. The mobile device estimator 1301 may have a receiver 1303, a probe data aggregator 1305, a trajectory normalizer 1307, a spatial analyzer 1309, a mobile device counter 1311, and an application extension 1313. More, different, or fewer components may be provided. The mobile device estimator 1301 may be implemented by the server 101 of FIGS. 1 and 12 or by another computing device remote to the mobile device 107.

The receiver 1303 may be configured for digital or analog communication with one or more position sensors. For example, the receiver 1303 may be configured to receive location information from one or more position sensors or mobile devices through the network 105. The receiver may be implemented by or a part of the communication interface 1205 of the server 101. The receiver 903 may include one or more amplifiers, digital to analog converters, or analog to digital converters. The location data received by the receiver may include a plurality of probe data points generated by one or more vehicles, position sensors, or mobile devices. The receiver may be configured to receive probe data. Probe data points of the probe data may include a location, a timestamp, and/or a session identifier. The mobile devices generating the probe data may generate probe data points at different rates. In some cases, the mobile devices may update session identifiers at different rates.

The probe data aggregator 1305 may be implemented by the processor 1201 based on instructions stored in the memory 1203 of the server 101. The probe data aggregator may be configured to construct trajectories from the probe data. A trajectory may include one or more probe data points. The probe data points in the trajectory may share a same session identifier. The trajectory may have a path. The path may trace or follow the locations of the probe data points in the trajectory. The probe data points may be ordered in the trajectory. For example, the probe data points may be ordered sequentially. The order may be based on the timestamps. For example, the probe data points may be ordered from oldest to newest or from newest to oldest. The path of the trajectory may follow the order of the probe data points. In this way, the path of the trajectory may reflect the path of the mobile device generating the probe data points as represented by the location or timestamp information in the probe data points.

The trajectory normalizer 1307 may be implemented by the processor 1201 based on instructions stored in the memory 1203 of the server 101. The trajectory normalizer may be configured to determine a trajectory duration of the trajectory. The trajectory duration may be based on the timestamp information of the probe data points in the trajectory. For example, the trajectory duration may be the time elapsed between the creation of the newest probe data point and the oldest probe data point in the trajectory. The elapsed time may be found by subtracting the timestamps. The trajectory normalizer 1307 may be configured to normalize the trajectory duration. The trajectory duration may be normalized over an observation duration. For example, the trajectory duration may be normalized by dividing the trajectory duration by the observation duration. The result of normalizing the trajectory duration is a normalized trajectory.

The spatial analyzer 1309 may be implemented by the processor 1201 based on instructions stored in the memory 1203 of the server 101. The spatial analyzer 1309 may be configured to identify a boundary between two or more observation areas that is crossed by a trajectory. The spatial analyzer 1309 may expand the path of the boundary-crossing trajectory by a radius to generate a trajectory area. The radius may be selected based on a horizontal accuracy of a global positioning signal of the probe data points in the trajectory. The spatial analyzer 1309 may be configured to determine a first portion of the trajectory area located in a first observation area and a second portion of the trajectory area located in a second observation area. The spatial analyzer 1309 may normalize the trajectory area. For example, the trajectory area may be normalized by dividing the portion of the trajectory by the area of the observation area. The result of normalizing the trajectory area is normalized trajectory area. Where the trajectory traversed two observation areas, for example, two normalized trajectory areas may be determined, each normalized trajectory area corresponding to (and normalized for) the observation area that the portion of the trajectory area is located in.

The mobile device counter 1311 may be implemented by the processor 1201 based on instructions stored in the memory 1203 of the server 101. The mobile device counter may estimate a number of mobile devices based on the normalized trajectories. For example, the sum of the normalized trajectories may estimate the number of mobile devices. In some cases, the normalized trajectories may be modified by the normalized trajectory areas. The mobile device counter may take into account the normalized trajectory area. For example, within a first observation area, the mobile device 1311 counter may modify (e.g. multiply) a normalized trajectory with the normalized trajectory for the first observation area and sum the product with one or more other trajectories in the first observation area. Within a second observation area, the mobile device counter 1311 may modify (e.g. multiply) a normalized trajectory with the normalized trajectory for the second observation area and sum the product with one or more other trajectories in the second observation area. The sum of the total mobile devices in the observation areas may estimate the number of mobile devices for the observation areas. The mobile device counter 1311 may be configured to estimate a population (e.g. a human population) based on the estimated number or count of mobile devices.

The application extension 1313 may be implemented by the processor 1201 based on instructions stored in the memory 1203 of the server 101. The application extension may determine a traffic estimate or an autonomous navigation instruction based on the estimated population. For example, the application extension 1313 may use the population to determine a measure of congestion for a path or road. In another example, the application extension 1313 may use the population to generate a navigation instruction directing a vehicle toward or away from a high or low population dense area.

Figure 14:
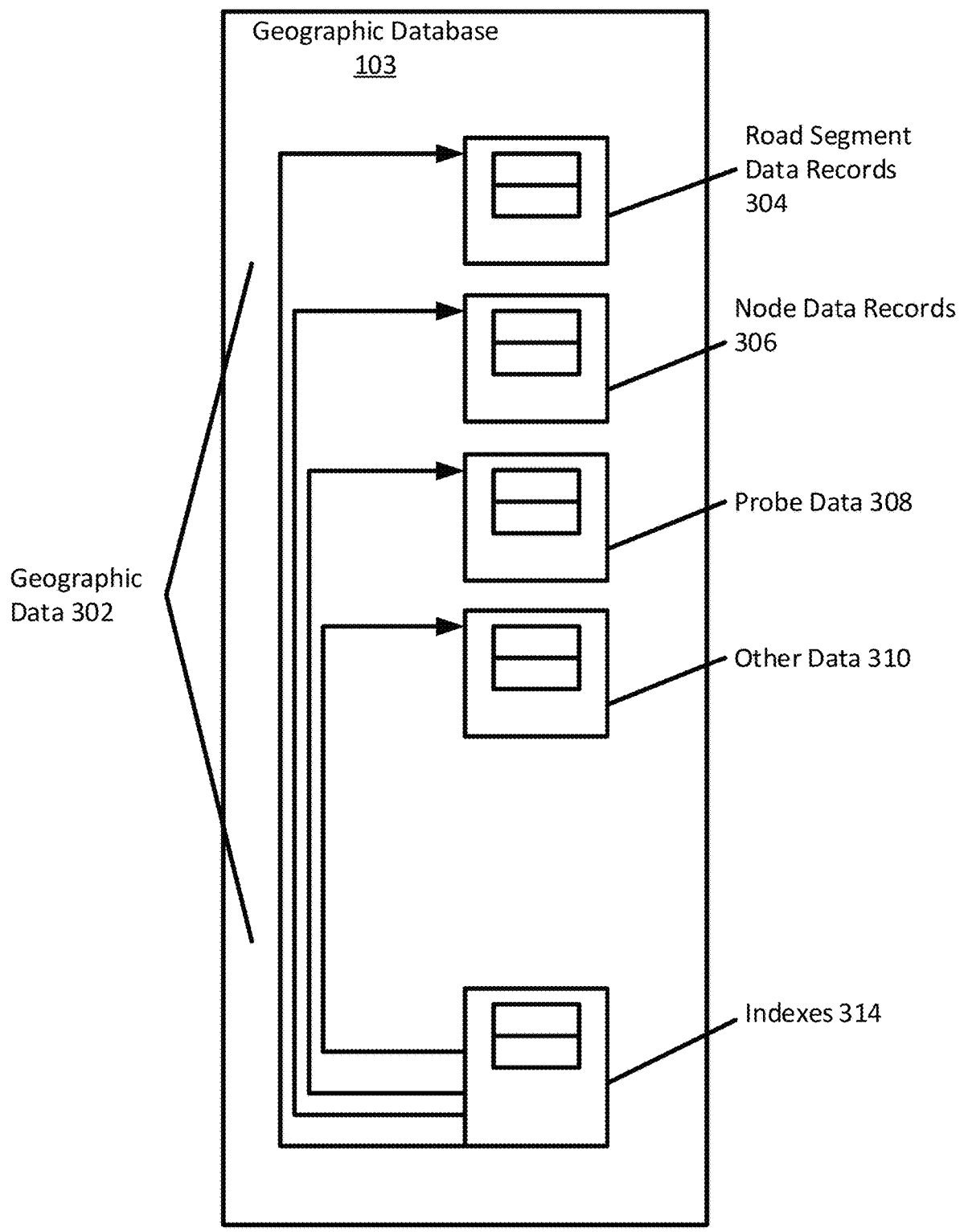
FIGS. 14 and 15 illustrate example geographic databases.

FIG. 14 illustrates an example geographic database. The geographic database 103 may contain at least one road segment database record 304 (also referred to as "entity" or "entry") for each road segment in a particular geographic region. The geographic database 103 may also include a node database record 306 (or "entity" or "entry") for each node in a particular geographic region. The terms "nodes" and "segments" represent only one terminology for describing these physical geographic features, and other terminology for describing these features is intended to be encompassed within the scope of these concepts. The geographic database 103 may also include location fingerprint data for specific locations in a particular geographic region.

The geographic database 103 may include probe data 308. The probe data 308 may include probe data points generated by one or more mobile devices 107. The mobile devices 107 may send the probe data 308 to the database 103 via the network 105.

The geographic database 103 may include other kinds of data 310. The other kinds of data 310 may represent other kinds of geographic features or anything else. The other kinds of data may include point of interest (POI) data. For example, the POI data may include POI records comprising a type (e.g., the type of POI, such as restaurant, hotel, city hall, police station, historical marker, ATM, golf course, etc.), location of the POI, a phone number, hours of operation, etc.

The geographic database 103 also includes indexes 314. The indexes 314 may include various types of indexes that relate the different types of data to each other or that relate to other aspects of the data contained in the geographic database 103. For example, the indexes 314 may relate the nodes in the node data records 306 with the end points of a road segment in the road segment data records 304.

The geographic database 103 may also include other attributes of or about roads such as, for example, geographic coordinates, physical geographic features (e.g., lakes, rivers, railroads, municipalities, etc.) street names, address ranges, speed limits, turn restrictions at intersections, and/or other navigation related attributes (e.g., one or more of the road segments is part of a highway or toll way, the location of stop signs and/or stoplights along the road segments), as well as POIs, such as gasoline stations, hotels, restaurants, museums, stadiums, offices, automobile dealerships, auto repair shops, buildings, stores, parks, municipal facilities, other businesses, etc. The geographic database 103 may also contain one or more node data record(s) 306 which may be associated with attributes (e.g., about the intersections) such as, for example, geographic coordinates, street names, address ranges, speed limits, turn restrictions at intersections, and other navigation related attributes, as well as POIs such as, for example, gasoline stations, hotels, restaurants, museums, stadiums, offices, automobile dealerships, auto repair shops, buildings, stores, parks, etc. The geographic data 302 may additionally or alternatively include other data records such as, for example, POI data records, topographical data records, cartographic data records, routing data, and maneuver data. Other contents of the database 103 may include temperature, altitude or elevation, lighting, sound or noise level, humidity, atmospheric pressure, wind speed, the presence of magnetic fields, electromagnetic interference, or radio- and micro-waves, cell tower and wi-fi information, such as available cell tower and wi-fi access points, and attributes pertaining to specific approaches to a specific location.

The geographic database 103 may include historical traffic speed data for one or more road segments. The geographic database 103 may also include traffic attributes for one or more road segments. A traffic attribute may indicate that a road segment has a high probability of traffic congestion.

Figure 15:
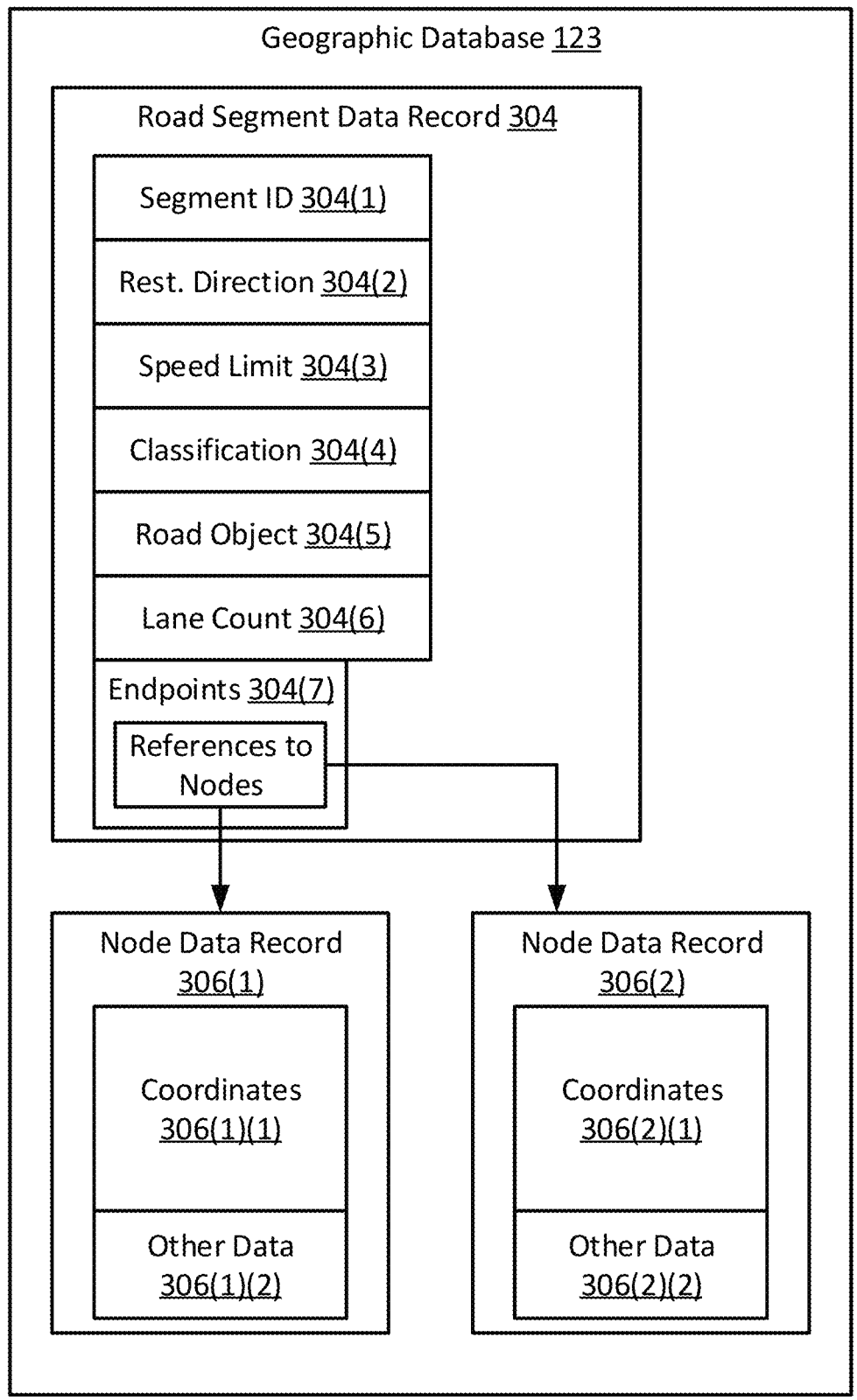

FIG. 15 shows some of the components of a road segment data record 304 contained in the geographic database 103 according to one embodiment. The road segment data record 304 may include a segment ID 304(1) by which the data record can be identified in the geographic database 103. Each road segment data record 304 may have associated information (such as "attributes", "fields", etc.) that describes features of the represented road segment. The road segment data record 304 may include data 304(2) that indicate the restrictions, if any, on the direction of vehicular travel permitted on the represented road segment. The road segment data record 304 may include data 304(3) that indicate a speed limit or speed category (i.e., the maximum permitted vehicular speed of travel) on the represented road segment. The road segment data record 304 may also include classification data 304(4) indicating whether the represented road segment is part of a controlled access road (such as an expressway), a ramp to a controlled access road, a bridge, a tunnel, a toll road, a ferry, and so on. The road segment data record may include location fingerprint data, for example a set of sensor data for a particular location.

The geographic database 103 may include road segment data records 304 (or data entities) that describe features such as road objects 304(5). The road objects 304(5) may be stored according to location boundaries or vertices. The road objects 304(5) may be stored as a field or record using a scale of values such as from 1 to 100 for type or size. The road objects 304(5) may be stored using categories such as low, medium, or high. Additional schema may be used to describe the road objects 304(5). The attribute data may be stored in relation to a link/segment 304, a node 306, a strand of links, a location fingerprint, an area, or a region. The geographic database 103 may store information or settings for display preferences. The geographic database 103 may be coupled to a display. The display may be configured to display the roadway network and data entities using different colors or schemes.

The road segment data record 304 may include a lane count 304(6) for the road segment. The lane count 304(6) may be a numerical value indicating the number of lanes of the road segment. The lane count 304(6) may indicate the number of lanes for the whole width of the road segment or for one direction of travel along the road segment. In some cases, the road segment data record 304 includes a lane count 304(6) for each direction of travel along the road segment.

The road segment data record 304 also includes data 304(7) providing the geographic coordinates (e.g., the latitude and longitude) of the end points of the represented road segment. In one embodiment, the data 304(7) are references to the node data records 306 that represent the nodes corresponding to the end points of the represented road segment.

The road segment data record 304 may also include or be associated with other data 304(7) that refer to various other attributes of the represented road segment. The various attributes associated with a road segment may be included in a single road segment record or may be included in more than one type of record which cross-references to each other. For example, the road segment data record 304 may include data identifying what turn restrictions exist at each of the nodes which correspond to intersections at the ends of the road portion represented by the road segment, the name, or names by which the represented road segment is identified, the street address ranges along the represented road segment, and so on.

FIG. 15 also shows some of the components of a node data record 306 that may be contained in the geographic database 103. Each of the node data records 306 may have associated information (such as "attributes", "fields", etc.) that allows identification of the road segment(s) that connect to it and/or its geographic position (e.g., its latitude and longitude coordinates). The node data records 306(1) and 306(2) include the latitude and longitude coordinates 306(1)(1) and 306(2)(1) for their node. The node data records 306(1) and 306(2) may also include other data 306(1)(2) and 306(2)(2) that refer to various other attributes of the nodes.

The geographic database 103 may be maintained by a content provider (e.g., a map developer). By way of example, the map developer may collect geographic data to generate and enhance the geographic database 103. The map developer may obtain data from sources, such as businesses, municipalities, or respective geographic authorities. In addition, the map developer may employ field personnel to travel throughout a geographic region to observe features and/or record information about the roadway. Remote sensing, such as aerial or satellite photography, may be used The geographic database 103 and the data stored within the geographic database 103 may be licensed or delivered on-demand. Other navigational services or traffic service providers may access the location fingerprint data, traffic data and/or the lane line object data stored in the geographic database 103.

The mobile device 107, server 101, or processors 1101, 1201 may include a general processor, digital signal processor, an application specific integrated circuit (ASIC), field programmable gate array (FPGA), analog circuit, digital circuit, combinations thereof, or other now known or later developed processor. The mobile device 107, server 101, or processors 1101, 1201 may be a single device or combinations of devices, such as associated with a network, distributed processing, or cloud computing.

The memory 1109, 1203 may be a volatile memory or a non-volatile memory. The memory 1109, 1203 may include one or more of a read only memory (ROM), random access memory (RAM), a flash memory, an electronic erasable program read only memory (EEPROM), or other type of memory. The memory 1109, 1203 may be removable from the mobile device 107 or server 101, such as a secure digital (SD) memory card.

The communication interface 1105, 1205 may include any operable connection. An operable connection may be one in which signals, physical communications, and/or logical communications may be sent and/or received. An operable connection may include a physical interface, an electrical interface, and/or a data interface. The communication interface 1105, 1205 provides for wireless and/or wired communications in any now known or later developed format.

The database 103 may include geographic data used for traffic and/or navigation-related applications. The geographic data may include data representing a road network or system including road segment data and node data. The road segment data represent roads, and the node data represent the ends or intersections of the roads. The road segment data and the node data indicate the location of the roads and intersections as well as various attributes of the roads and intersections. Other formats than road segments and nodes may be used for the geographic data. The geographic data may include structured cartographic data or pedestrian routes.

The database 103 may also include other attributes of or about the roads such as, for example, geographic coordinates, street names, address ranges, speed limits, turn restrictions at intersections, and/or other navigation related attributes (e.g., one or more of the road segments is part of a highway or toll way, the location of stop signs and/or stoplights along the road segments), as well as points of interest (POIs), such as gasoline stations, hotels, restaurants, museums, stadiums, offices, automobile dealerships, auto repair shops, buildings, stores, parks, etc. The databases may also contain one or more node data record(s) which may be associated with attributes (e.g., about the intersections) such as, for example, geographic coordinates, street names, address ranges, speed limits, turn restrictions at intersections, and other navigation related attributes, as well as POIs such as, for example, gasoline stations, hotels, restaurants, museums, stadiums, offices, automobile dealerships, auto repair shops, buildings, stores, parks, etc. The geographic data may additionally or alternatively include other data records such as, for example, POI data records, topographical data records, cartographic data records, routing data, and maneuver data.

The database 103 may include historical traffic speed data for one or more road segments. The database 103 may also include traffic attributes for one or more road segments. A traffic attribute may indicate that a road segment has a high probability of traffic congestion.

The input device 1103, 1207 may be one or more buttons, keypad, keyboard, mouse, stylus pen, trackball, rocker switch, touch pad, voice recognition circuit, or other device or component for inputting data to the mobile device 107 or server 101. The input device 1103, 1207 and display 1111 may be combined as a touch screen, which may be capacitive or resistive. The display 1111 may be a liquid crystal display (LCD) panel, light emitting diode (LED) screen, thin film transistor screen, or another type of display. The output interface of the display 1111 may also include audio capabilities, or speakers. In an embodiment, the input device 1103, 1207 may involve a device having velocity detecting abilities.

The positioning circuitry 1113 or a position sensor may include suitable sensing devices that measure the traveling distance, speed, direction, and so on, of a vehicle or mobile device 107. The positioning system may also include a receiver and correlation chip to obtain a GPS signal. Alternatively or additionally, the one or more detectors or sensors may include an accelerometer and/or a magnetic sensor built or embedded into or within the interior of the vehicle or mobile device 107. The accelerometer is operable to detect, recognize, or measure the rate of change of translational and/or rotational movement of the vehicle or mobile device 107. The magnetic sensor, or a compass, is configured to generate data indicative of a heading of the vehicle or mobile device 107. Data from the accelerometer and the magnetic sensor may indicate orientation of the vehicle or mobile device 107. The vehicle or mobile device 107 receive location data from the positioning system. The location data indicates the location of the vehicle or mobile device 107.

The positioning circuitry 1113 or a position sensor may include a Global Positioning System (GPS), Global Navigation Satellite System (GLONASS), or a cellular or similar position sensor for providing location data. The positioning system may utilize GPS-type technology, a dead reckoning-type system, cellular location, or combinations of these or other systems. The positioning circuitry 1113 or a position sensor may include suitable sensing devices that measure the traveling distance, speed, direction, and so on, of the vehicle or mobile device 107. The positioning system may also include a receiver and correlation chip to obtain a GPS signal. The vehicle or mobile device 107 receives location data from the positioning system. The location data indicates the location of the vehicle or mobile device 107.

The positioning circuitry 1113 or a position sensor may also include gyroscopes, accelerometers, magnetometers, or any other device for tracking or determining movement of a mobile device. The gyroscope is operable to detect, recognize, or measure the current orientation, or changes in orientation, of a mobile device. Gyroscope orientation change detection may operate as a measure of yaw, pitch, or roll of the mobile device.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionalities as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

As used in this application, the term 'circuitry' or 'circuit' refers to all of the following: (a)hardware-only circuit implementations (such as implementations in only analog and/or digital circuitry) and (b) to combinations of circuits and software (and/or firmware), such as (as applicable): (i) to a combination of processor(s) or (ii) to portions of processor (s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

Processors suitable for the execution of a computer program include, by way of example, both general and special purpose microprocessors, and anyone or more processors of any kind of digital computer. Generally, a processor receives instructions and data from a read only memory or a random-access memory or both. The essential elements of a computer are a processor for performing instructions and one or more memory devices for storing instructions and data. Generally, a computer also includes, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media, and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry. In an embodiment, a vehicle may be considered a mobile device, or the mobile device may be integrated into a vehicle.

To provide for interaction with a user, embodiments of the subject matter described in this specification can be implemented on a device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored. These examples may be collectively referred to as a non-transitory computer readable medium.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, are apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

We claim:

1. A method for estimation of a count of a plurality of mobile devices, the method comprising:
receiving, by a processor, one or more probe data points including a location, a session identifier, and a timestamp, wherein the one or more probe data points are generated by the plurality of mobile devices within an observation area and during an observation duration;
constructing, by the processor, a trajectory including the one or more probe data points having a same session identifier and generated by one mobile device of the plurality of the mobile devices, wherein a path of the trajectory is based on the location of the one or more probe data points;
calculating, by the processor, a trajectory duration for the trajectory based on timestamps of the one or more probe data
points having the same session identifier;
calculating, by the processor, a normalized trajectory from the trajectory duration and a predetermined observation duration; and
estimating, by the processor, the count of the plurality of mobile devices including at least the normalized trajectory of the one mobile device of the plurality of mobile devices, the count reflecting that the one mobile device of the plurality of mobile devices is counted as a single mobile device that generated the same session identifier.

2. The method of claim 1, further comprising:
ordering, by the processor, the one or more probe data points sequentially based on the timestamp of the one or more probe data points,
wherein the trajectory includes the probe data points in sequential order.

3. The method of claim 1, further comprising:
identifying, by the processor, a boundary between a first observation area and second observation area crossed by the trajectory; and
expanding, by the processor, the path of the trajectory by a radius, where a result of the expanding is a trajectory area.

4. The method of claim 3, further comprising:
dividing, by the processor, an area of a first portion of the trajectory area located in the first observation area by an area of the first observation area, where a result of the first dividing is a first normalized trajectory area; and
dividing, by the processor, an area of a second portion of the trajectory area located in the second observation area by an area of the second observation area, where a result of the second dividing is a second normalized trajectory area.

5. The method of claim 4, further comprising:
estimating, by the processor, a number of mobile devices in the first observation area from at least the first normalized trajectory area; and
estimating, by the processor, a number of mobile devices in the second observation area from at least the second normalized trajectory area.

6. The method of claim 3, wherein the radius is based on a horizontal accuracy of a global positioning signal of the probe data points.

7. The method of claim 1, further comprising:
determining, by the processor, a traffic estimate or an autonomous navigation instruction based on the count.

8. The method of claim 1, wherein the probe data points are generated by the mobile devices, and
wherein the mobile devices generate the probe data points at different rates.

9. The method of claim 8, wherein the mobile devices update the session identifier at different rates.

10. The method of claim 1, wherein the location includes global positioning coordinates.

11. An apparatus for estimating a count of a plurality of mobile devices, the apparatus comprising:
a receiver configured to receive one or more probe data points including a location, a session identifier, and a timestamp, wherein the one or more probe data points are generated by the plurality of mobile devices within an observation area and during an observation duration;
a probe data aggregator configured to construct a trajectory including the one or more probe data points having a same session identifier and generated by one mobile device of the plurality of the mobile devices, wherein a path of the trajectory is based on the location of the one or more probe data points;
a trajectory normalizer configured to calculate a trajectory duration for the trajectory based on timestamps of the one or more probe data points having the same session identifier and calculate a normalized trajectory from the trajectory duration and a predetermined observation duration; and
a mobile device counter configured to estimate the count of the plurality of mobile devices including at least the normalized trajectory of the one mobile device of the plurality of mobile devices, the count reflecting that the one mobile device of the plurality of mobile devices is counted as a single mobile device that generated the same session identifier.

12. The apparatus of claim 11, wherein the probe data aggregator is configured to order the one or more data points sequentially based on the timestamps,
wherein the trajectory includes the probe data points in sequential order.

13. The apparatus of claim 11, further comprising:
a spatial analyzer configured to identify a boundary between a first observation area and second observation area crossed by the trajectory and expand the path of the trajectory by a radius, where a result of the expanding is a trajectory area.

14. The apparatus of claim 13, wherein the spatial analyzer is configured to divide an area of a first portion of the trajectory area located in the first observation area by an area of the first observation area, where a result of the first dividing is a first normalized trajectory area and divide an area of a second portion of the trajectory area located in the second observation area by an area of the second observation area, where a result of the second dividing is a second normalized trajectory area.

15. The apparatus of claim 14, wherein the mobile device counter is configured to estimate a number of mobile devices in the first observation area from at least the first normalized trajectory area and estimate a number of mobile devices in the second observation area from at least the second normalized trajectory area.

16. The apparatus of claim 13, wherein the spatial analyzer is further configured to select the radius based on a horizontal accuracy of a global positioning signal of the probe data points.

17. The apparatus of claim 11, further comprising:
an application extension configured to determine a traffic estimate or an autonomous navigation instruction based on the number of mobile devices.

18. The apparatus of claim 11, wherein the one or more mobile devices generate the probe data points at different rates.

19. The apparatus of claim 11, wherein the one or more mobile devices update the session identifier at different rates.

20. A non-transitory computer-readable medium including instructions that, when executed by a processor, are operable to:
receive one or more probe data points including a location, a session identifier, and a timestamp, wherein the one or more probe data points are generated by a plurality of mobile devices within an observation area and during an observation duration;
construct a trajectory including the one or more probe data having a same session identifier and generated by one mobile device of the plurality of the mobile devices, wherein a path of the trajectory is based on the location of the one or more probe data points;
calculate a trajectory duration based on timestamps of the one or more probe data points having the same session identifier included in the trajectory;
calculate a normalized trajectory from division of each trajectory duration by a predetermined duration; and
determine a count of the plurality of mobile devices for the predetermined duration based on a sum of the normalized trajectory, including at least the normalized trajectory of the one mobile device of the plurality of mobile devices, the count reflecting that the one mobile device of the plurality of mobile devices is counted as a single mobile device that generated the same session identifier.

* * * * *